(12) United States Patent
Shlyk et al.

(10) Patent No.: US 8,357,309 B2
(45) Date of Patent: Jan. 22, 2013

(54) CLASS OF FERROMAGNETIC SEMICONDUCTORS

(75) Inventors: Larysa Shlyk, Lexington, KY (US);
Sergly Alexandrovich Kryukov, Lexington, KY (US); Lance Eric De Long, Lexington, KY (US); Barbara Schüpp-Niewa, Hallbergmoos (DE); Rainer Niewa, Hallbergmoos (DE)

(73) Assignee: University of Kentucky Research Foundation, Lexington, KY (US)

( * ) Notice: Subject to any disclaimer, the term of this patent is extended or adjusted under 35 U.S.C. 154(b) by 760 days.

(21) Appl. No.: 12/062,076

(22) Filed: Apr. 3, 2008

(65) Prior Publication Data

US 2008/0277748 A1 Nov. 13, 2008

Related U.S. Application Data

(60) Provisional application No. 60/921,641, filed on Apr. 3, 2007.

(51) Int. Cl.
*C01G 55/00* (2006.01)
*C01G 23/00* (2006.01)
*C01G 23/04* (2006.01)

(52) U.S. Cl. ......... 252/62.62; 252/62.51 R; 252/62.3 R; 117/944; 257/421; 423/593.1; 423/594.6; 423/594.2; 423/598; 423/594.9; 423/594.16

(58) Field of Classification Search ............... 252/62.62, 252/62.51 R, 62.3 R; 423/593.1, 594.6, 594.2, 423/598, 594.9, 594.16; 117/944; 257/421
See application file for complete search history.

(56) References Cited

PUBLICATIONS

Verdoes et al, "Equilbria Description for the System BaO-RuO2-Fe2O3 with less than 55 mol%BaO at 1300C in Platinum Capsules: A Crystallographic and Leaching Study", Mat. Res. Bull. vol. 22, pp. 1-10, 1987.*
Martinez et al, "Magnetic Behavior of the BaFe4-2xSn2-xCoxO11 System: From Cluster Glass to Kagome Phase", Phy. Rev. B, vol. 48, No. 22, Dec. 1, 1993, pp. 16440-16448.*
Thompson et al, "Structure-property Relationships in te R-type hexaferrites: Cation distribution and magnetic susceptibilites of MX2Fe4O11", Hyperfine Interactions, 94(1994), pp. 2039-2044.*
Sosnowska et al, "Neutron diffraction studies of the Fe3+ magnetic moments arrangements in the spun-glass systems BaTi2Fe4O11 and BaSn2Fe4011", Physica B, 234-236, (1997), pp, 934-936.*
Przeniosla et al, "Determination of the Fe/Sn atoms distribution in BaSn2Fe4O11 by neutron and synchrotron radiation diffraction", Physica B 234-236, (1997), pp. 931-933.*
Foo et al, "Synthesis, Structure and physical propeties of Ru ferrites: BaMRu5o11 (M=Li and Cu) and BaM'2ru4o11 (M'=Mn, Fe and Co", Journ. Solid State Chem. 179, Dec. 19, 2005, pp. 563-572.*
Shlyk, L., et al., Structural, magnetic, and transport properties of a novel class of ferromagnetic semiconductors: $SrM_{2\pm x}Ru_{4\pm x}O_{11}$ (M=Fe, Co), Journal of Applied Physics 103, 07D1, 12 (2008).
Foo, M.L., et al., "Synthesis, structure and physical properties of Ru ferrites: Ba/$M_2Ru_5O_{11}$ (M=Li and Cu) and Ba$M'_2Ru_4O_{11}$ (M'=Mn, Fe and Co)", Journal of Solid State Chemistry 179 (2006) 563-572.

(Continued)

*Primary Examiner* — Carol M Koslow
(74) *Attorney, Agent, or Firm* — Crowell & Moring LLP

(57) ABSTRACT

Single crystal and polycrystal oxoruthenates having the generalized compositions $(Ba_z,Sr_{1-z})Fe_xCo_yRu_{6-(x+y)}O_{11}$ ($1 \leq (x+y) \leq 5$; $0 \leq z \leq 1$) and $(Ba,Sr)M_{2\pm x}Ru_{4\mp x}O_{11}$ (M=Fe,Co) belong to a novel class of ferromagnetic semiconductors with applications in spin-based field effect transistors, spin-based light emitting diodes, and magnetic random access memories.

15 Claims, 18 Drawing Sheets

PUBLICATIONS

Verdoes, D., et al., "Equilibria Description for the System BaO-$RuO_2$-$Fe_2O_3$ With Less Than 55 Mol% BaO at 1300° C. in Platinum Capsules; A Crystallographic and Leaching Study," 1987 Pergamon Journals Ltd., Mat. Res. Bull., vol. 22, pp. 1-10.

Larysa Shlyk et al., High-Temperature Ferromagnetism and Tunable Semiconductivity of (Ba, Sr)$M_{2\pm x}Ru_{4\pm x}O_{11}$ (M=Fe, Co): A New Paradigm for Spintronics, Advanced Materials, published online Mar. 18, 2008, 9999, pp. 1-6.

Barbar Schüpp-Niewa et al., $BAFe_{3.39(5)}Ru_{2.61(5)}O_{11}$ and $BaCo_{1.85(6)}Ru_{4.15(6)}O_{11}$, Preparation Crystal Structures, and Magnetic and Transport Properties of Quaternary Transition Metal Oxoruthenates, Z. Naturforsch, 62b, Jun. 2007, pp. 753-758.

* cited by examiner

CLASS OF FERROMAGNETIC SEMICONDUCTORS

CROSS REFERENCE TO RELATED APPLICATIONS

The present invention claims priority to U.S. Provisional Patent Application Ser. No. 60/921,641, filed Apr. 3, 2007, the entire disclosure of which is herein expressly incorporated by reference.

BACKGROUND AND SUMMARY OF THE INVENTION

From time to time new materials are discovered that serve as a basis for new or improved technologies with substantial commercial value in the marketplace. In the present day, there is considerable interest in discovering new materials for the development of spin-transport electronics ("spintronics"), in which the spin of charge carriers is exploited to provide enhanced functionality for microelectronic devices. In particular, the development of room-temperature ferromagnetic semiconductors comprises a central part of an ongoing, intensive effort to develop spin-based field effect transistors, spin-based light emitting diodes, and magnetic random access memory. If suitable novel classes of materials can be developed to underpin these new devices, they would enable a revolution in electronics and information technologies.

Ferromagnetic semiconductors are possibly the most intensively studied materials for spintronic applications. GaAs and ZnO doped with 3d elements are now widely studied as prototypical ferromagnetic semiconductors. The ideal ferromagnetic semiconductor material preferably has the following basic characteristics at room temperature:
1) Semiconducting gap of order 0.1-0.3 eV;
2) Ferromagnetic state with an ordered moment of at least 0.05 μB/per formula unit;
3) Carrier concentration ($10^{16}$-$10^{18}$/cm$^3$) sufficient to provide a useful spin current;
4) Carrier mobility on the order $10^{-2}$-$10^{-4}$ cm$^2$ V$^{-1}$·s$^{-1}$;
5) Moderate ferromagnetic coercive field (200-500 Oe) to facilitate switching of spin polarization; and
6) Compatibility with commercial substrate materials such as Si or $Al_2O_3$.

One obstacle to the implementation of spin-polarized semiconductor devices is the absence of suitable room-temperature, soft ferromagnetic semiconductors (FS's). Dilute magnetic semiconductors are under intense study for applications in spintronics. However, the weak solubility of randomly placed magnetic ions in the semiconductor host makes these materials unsuitable for devices. It is, therefore, desirable to develop a room-temperature FS based on a periodic array of magnetic ions.

We have found that ternary and other complex ruthenium ferrites exhibit long-range ferromagnetic order well above room temperature, accompanied by narrow-gap semiconducting properties that include a large anomalous Hall conductance, low resistivity, and high carrier concentration. Additionally, the physical properties can be tuned by simple chemical substitution of two elements, Fe and Co, or by varying the relative concentration of 3d and 4d elements within a homogeneity range that we have established. These promising properties—manifest within a single structural family—provide a fertile ground for fundamental studies and open up a host of potential device applications.

One inventive composition according to the present invention possesses a high ferromagnetic ordering temperature $T_c$ that we have shown can be freely tuned from 300 to 500 K by doping. This material is semiconducting with an approximate gap of 200 meV. The coercive field at T=300 K is nearly ideal at $H_c$=275 Oe. X-ray data show that samples are single phase, and single crystals are obtainable. These initial results indicate that this material is a viable candidate for spintronic devices.

Further, we have synthesized another closely related metallic ferromagnet with extremely small coercive field ($\approx$1 Oe) at T=80 K. This value is the same as for permalloy $Ni_{81}Fe_{19}$, which is a widely used metallic soft ferromagnet. It is particularly noteworthy that both of these inventive materials have the same crystal structure, which should facilitate the fabrication of composite heterostructures using these otherwise distinctly different materials.

We wish to emphasize that the new compositions come from a class of materials that are absolutely distinct from the GaAs and ZnO materials studied by other laboratories. The inventive compositions are not a "diluted magnetic semiconductors," which usually suffer from clustering of magnetic ions among random lattice sites. Rather, the magnetic ions in these materials reside on a periodic lattice. Thus, we have discovered an entirely new paradigm for ferromagnetic semiconductors with the potential for widening this class into an ensemble of interesting, compatible materials having a range of physical properties with commercial potential.

Compositionally, the materials discussed above belong to a class of materials known as oxoruthenates. Oxoruthenates have attracted recent attention due to their electronic and magnetic properties. Advantageous properties of these materials include, for example, the occurrence of unconventional superconductivity, metamagnetism and itinerant ferromagnetism. A large number of ternary and multinary ruthenates can be described in perovskite structures and variants thereof. One general feature is the occurrence of octahedrally-coordinated Ru connected with additional tetrahedrally-coordinated metal species.

According to the present invention, large single crystals of strontium and/or barium ruthenates containing a further transition metal from the third period of the periodic table have been grown with the aim of elucidating the crystal structures and magnetic properties of these attractive compounds, with a particular focus on the interdependence of magnetic properties and chemical composition.

According to one embodiment, the invention relates to single crystal and/or polycrystal oxoruthenates having the generalized composition $(Ba_z,Sr_{1-z})M_xRu_{6-x}O_{11}$ ($1 \leq x \leq 5$; $0 \leq z \leq 1$; M=Fe, Co). According to a further embodiment, the inventive oxoruthenates have the generalized composition $(Ba_z,Sr_{1-z})Fe_xCo_yRu_{6-(x+y)}O_{11}$ ($1 \leq (x+y) \leq 5$; $0 \leq z \leq 1$; when z=1 then x≠0). In an embodiment, x=0, or y=0, and when x=0 then z≠1. In another embodiment, the composition has a Curie temperature greater than or equal to about 300 K.

According to yet a further embodiment, the invention relates to single crystal oxoruthenates having a composition $BaFe_{2+x}Ru_{4-x}O_{11}$ (x=1.4) and $BaCo_{2-x}Ru_{4+x}O_{11}$ (x=0.2). The invention also relates to a broader range of ternary compositions, $SrM_{2\pm x}Ru_{4\mp x}O_{11}$ (M=Fe, Co) and $(Ba,Sr)M_{2\pm x}Ru_{4\mp x}O_{11}$ (M=Fe, Co).

Black plate-like single crystals of quaternary transition metal oxoruthenates having the composition $BaFe_{3.39(5)}Ru_{2.61(5)}O_{11}$ and $BaCo_{1.85(6)}Ru_{4.15(6)}O_{11}$ (hexagonal, space group P6$_3$/mmc (No. 194), Fe: a=5.856(1), c=13.587(1) Å, R1=0.029, wR2=0.084; Co: a=5.842(1), c=13.573(3) Å, R1=0.033, wR2=0.075) have been grown from a BaCl$_2$ flux.

X-ray refinements and charge balance considerations suggest that $Co^{2+}$ and mixed valence state $Ru^{3+}/Ru^{5+}$ and $Fe^{2+}/$ $Fe^{3+}$ are present in these compounds. Different occupations of the M(1) and M(2) sites by Ru and the 3d elements lead to deviations from the ideal compositions, $BaM_2Ru_4O_{11}$ and $SrM_2Ru_4O_{11}$; therefore, a homogeneity range ($BaM_{2\pm x}Ru_{4\mp x}O_{11}$ and $SrM_{2\pm x}Ru_{4\mp x}O_{11}$) has been discovered, which has important effects on physical properties. In one embodiment, the invention relates to a composition represented by the general formula $BaM_{2\pm n}Ru_{4\mp n}O_{11}$, wherein M=Fe and $0<n\leq 1.4$, or $SrM_{2\pm n}Ru_{4\mp n}O_{11}$, wherein M=Fe or Co and $0\leq n\leq 1.4$. Crystals grown from a $BaCl_2$ flux and/or a $SrCl_2$ flux according to the present invention are not restricted to a fixed composition.

Polycrystals of $SrFe_3Ru_3O_{11}$ or single crystals of $SrFe_{2.6}Ru_{3.4}O_{11}$, $SrFe_{2.8}Ru_{3.2}O_{11}$, and $SrCo_2Ru_4O_{11}$ were synthesized by solid-state reaction or grown from $SrCl_2$ flux. These compositions were confirmed by single crystal X-ray refinement and micro-probe analyses. Powder Rietveld refinement of the X-ray diffraction data were consistent with a composition of $SrFe_{3.0}Ru_{3.0}O_{11}$ (a=5.8375(4), c=13.403(1) Å).

The crystal structures contain two crystallographic sites with mixed Fe/Co and Ru occupation of different levels in octahedral coordination, and one site purely occupied by the respective 3d-metal. The latter position is in trigonal bipyramidal coordination, with some indication of a displacement of the metal cation towards tetrahedral coordination. According to the charge balance, the ruthenium is incorporated with different electronic situations in the two Ru-containing sites. The Co compound may be described as containing $Co^{2+}$ and $Ru^{5+}$ next to $Ru^{3+}$ Magnetic susceptibility data support this assignment.

According to magnetization measurements on orientated crystals, $BaCo_{1.85(6)}Ru_{4.15(6)}O_{11}$ is a soft ferromagnetic material with low coercive field and a spontaneous magnetization below $T_c$=105 K. It behaves as an electric conductor. However, $BaFe_{3.39(5)}Ru_{2.61(5)}O_{11}$ is a narrow band semiconductor material with ferrimagnetic ordering at $T_c$=440 K.

Other objects, advantages and novel features of the present invention will become apparent from the following detailed description of the invention when considered in conjunction with the accompanying drawings.

DETAILED DESCRIPTION OF THE DRAWINGS

Crystal Structure and Composition

Figure 1:
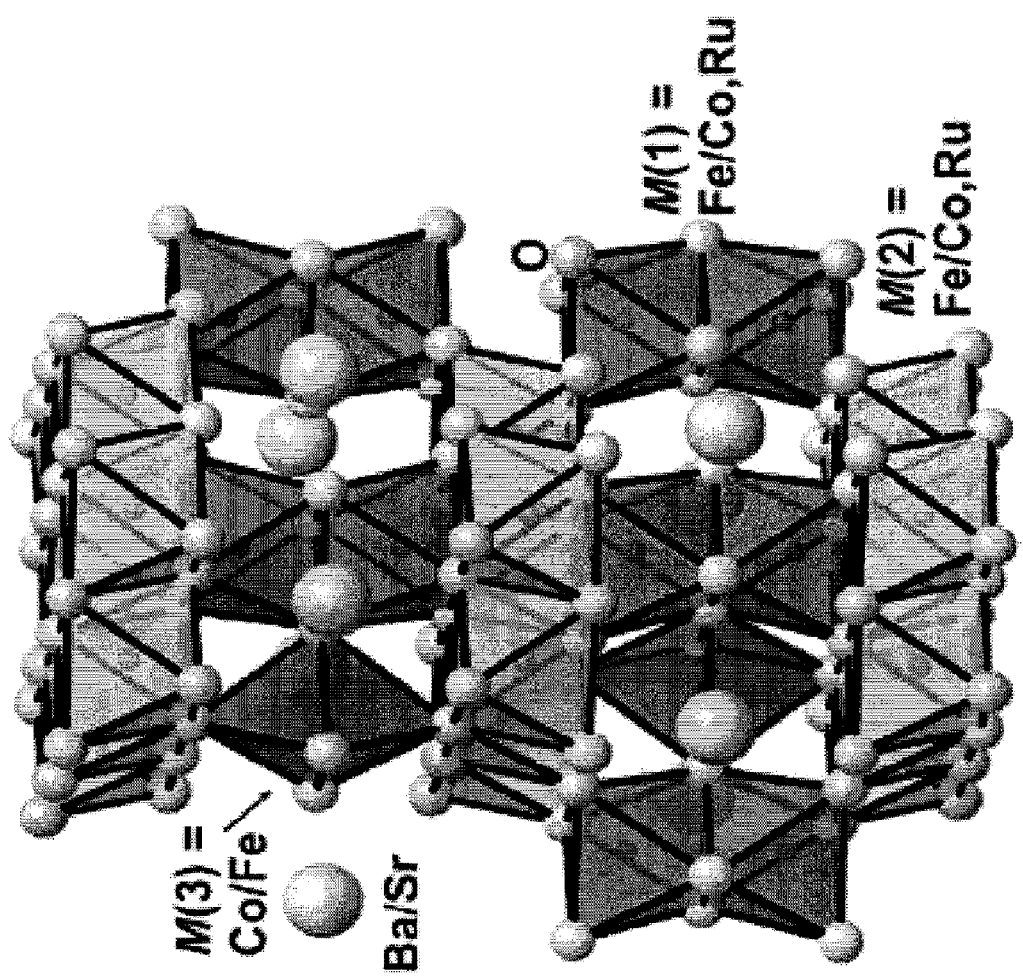
FIG. 1 is a schematic illustration of the crystal structure for $(Ba,Sr)M_{2\pm x}Ru_{4\mp x}O_{11}$ (M=Fe,Co)
Figure 2:
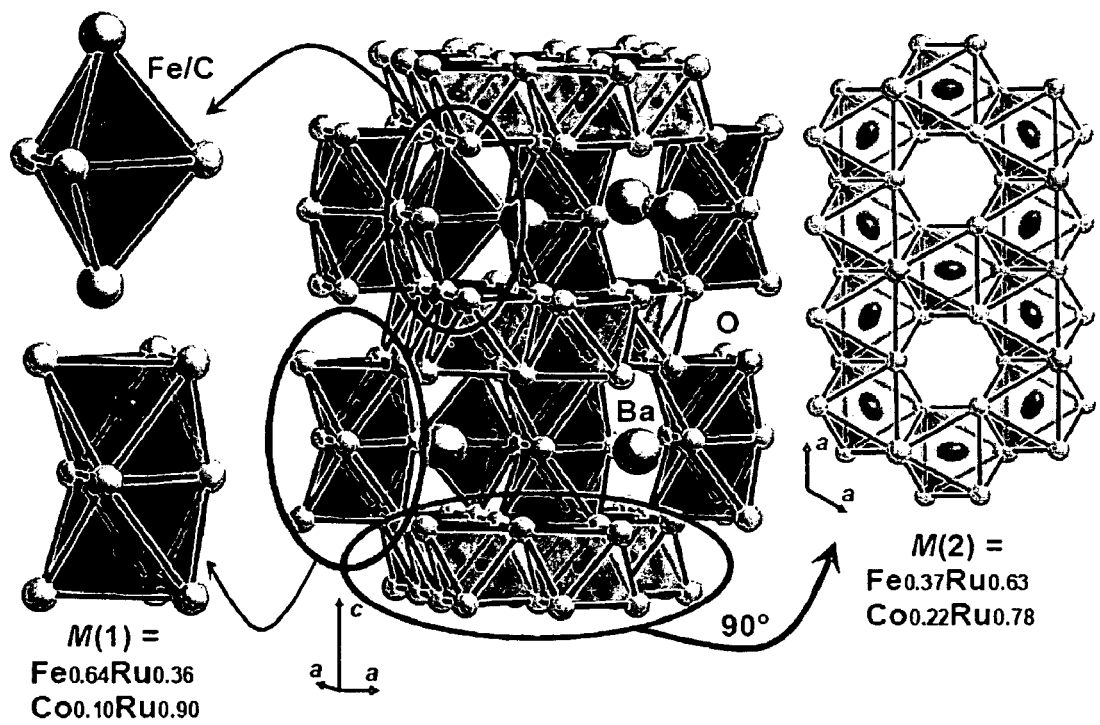
FIG. 2 is a schematic illustration of the crystal structure for $BaFe_{3.39(5)}Ru_{2.61(5)}O_{11}$ and $BaCo_{1.85(6)}Ru_{4.15(6)}O_{11}$.

Selected data on the crystal structure determinations and refinements for crystals having inventive compositions according to the present invention are shown in Tables 1 and 2. With reference to FIGS. 1 and 2, Ba and O form a distorted hexagonal close-packing motif, with Ba consequently located in anti-cuboctahedral coordination by O. Ru and Fe/Co occupy octahedral and trigonal bipyramidal interstices of this packing exclusively formed by O.

Figure 3:
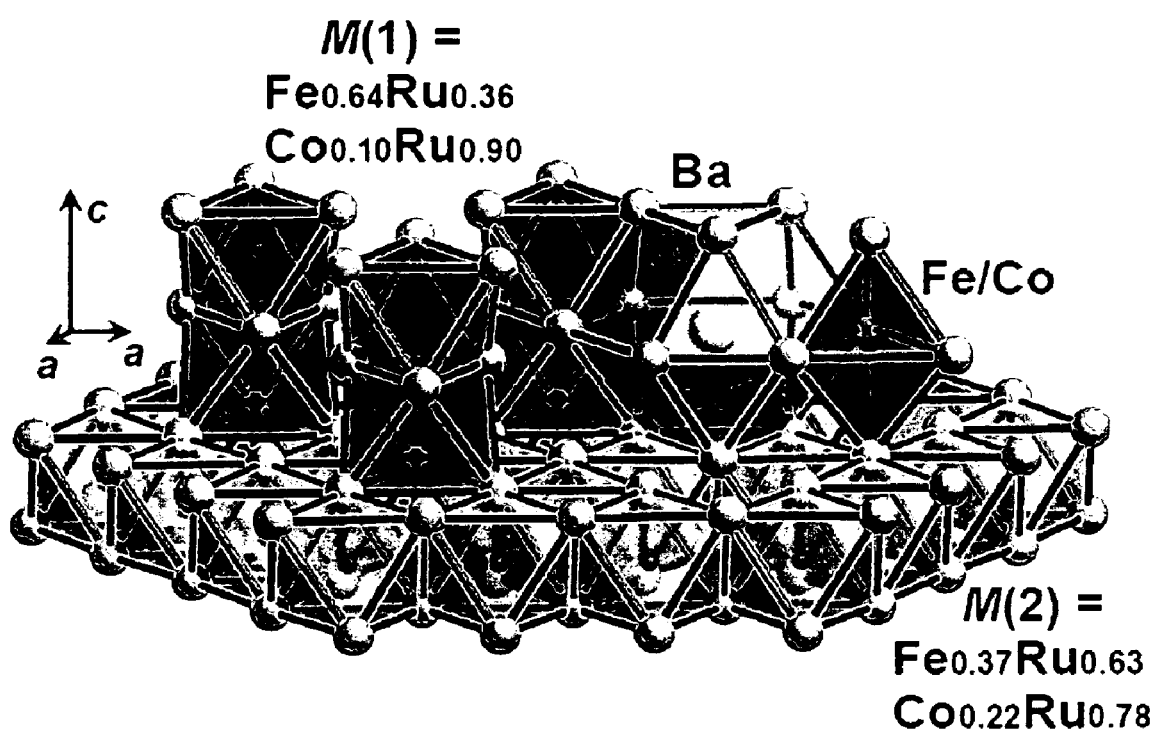
FIG. 3 shows the arrangement of coordination, polyhedra of transition metal Ba, and atoms in $BaFe_{3.39(5)}Ru_{2.61(5)}O_{11}$ and $BaCo_{1.85(6)}Ru_{4.15(6)}O_{11}$.
Figure 4:
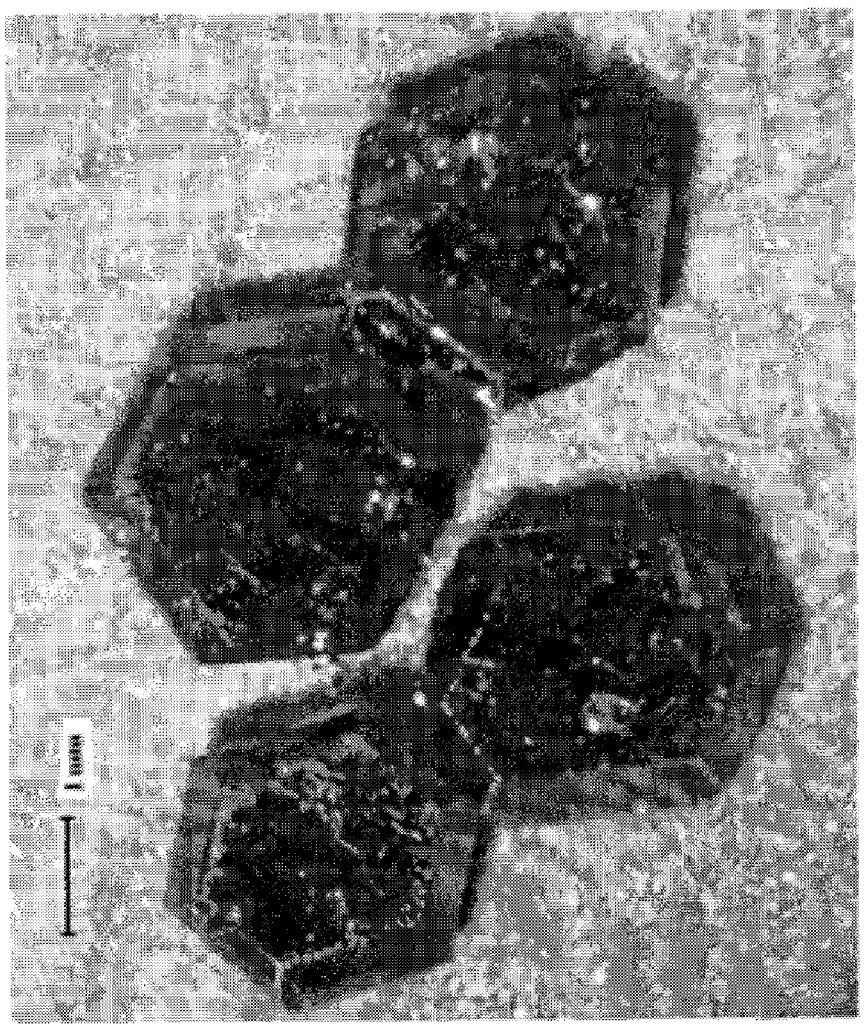
FIG. 4 is an optical micrograph of single crystals of strontium ferrites according to the present invention.

In FIGS. 1-3, layers of $M(2)O_6$ octahedra (lighter octahedra) are connected in the [001] direction via pairs of octahedra $M(1)_2O_9$ (darker octahedra) and trigonal prisms $FeO_5$ or $CoO_5$ (dark polyhedra), respectively. Ba (large pale spheres) is located within the layers of pairs of double octahedra and trigonal prisms. Occupation parameters for M(1) and M(2) are given. Emphasized polyhedra are drawn with displacement ellipsoids (99% probability, data from Fe compound). FIG. 4 is an optical micrograph of strontium ferrite single crystals according to the present invention.

TABLE 1

Crystal Structure data for $BaFe_{3.39(5)}Ru_{2.61(5)}O_{11}$ and $BaCo_{1.85(6)}Ru_{4.15(6)}O_{11}$

| | Formula | |
|---|---|---|
| | $BaFe_{3.39(5)}Ru_{2.61(5)}O_{11}$ | $BaCo_{1.85(6)}Ru_{4.15(6)}O_{11}$ |
| Crystal size, mm³ | 0.08 × 0.05 × 0.001 | 0.05 × 0.03 × 0.001 |
| Crystal system | hexagonal | hexagonal |
| Space group | $P6_3/mmc$ | $P6_3/mmc$ |
| a, Å | 5.856(1) | 5.842(1) |
| c, Å | 13.587(1) | 13.573(3) |
| V, Å³ | 403.5 | 398.2 |
| Z | 2 | 2 |
| D, calculated, g cm⁻³ | 6.32 | 7.02 |
| μ (Mo K$_\alpha$), mm⁻¹ | 15.5 | 16.3 |
| F(000), e | 695.3 | 753.0 |
| hkl range | ±7, ±7, ±17 | ±7, ±7, ±17 |
| $2\theta_{max}$, deg | 55.85 | 55.72 |
| Refl. measured | 6001 | 5990 |
| Refl. unique | 217 | 216 |
| $R_{int}$ | 0.045 | 0.047 |
| Param. refined | 22 | 22 |
| R(F)/wR(F²) (all reflections) | 0.029/0.084 | 0.033/0.075 |
| GoF (F²) | 1.413 | 1.053 |
| $\Delta_{\rho fin}$ (max/min), eÅ⁻³ | 1.30 | 0.86 |

TABLE 2

Crystal structure parameters for $BaFe_{3.39(5)}Ru_{2.61(5)}O_{11}$ (first row of parameters) and $BaCo_{1.85(6)}Ru_{4.15(6)}O_{11}$ (second row of parameters, in italics)

| Atom | Site | x | y | z | $U_{eq}/Å^2$ |
|---|---|---|---|---|---|
| Ba(1) | 2c | ⅓ | ⅔ | ¼ | 0.0112(4) |
| | | | | | *0.0149(5)* |
| M(1)* | 4e | 0 | 0 | 0.14844(9) | 0.0086(5) |
| | | | | *0.15158(7)* | *0.0105(5)* |
| M(2)* | 6g | ½ | 0 | 0 | 0.0132(4) |
| | | | | | *0.0177(4)* |
| Fe(3) | 2d | ⅔ | ⅓ | ¼ | 0.0341(9) |
| Co(3) | | | | | *0.0176(5)* |
| O(1)⁺ | 12k | 0.1706(3) | 2x | 0.0803(3) | 0.0105(9) |
| | | *0.1704(4)* | | *0.0797(3)* | *0.0125(9)* |
| O(2)⁺ | 6h | 0.3051(9) | ½x | ¼ | 0.010(1) |
| | | *0.299(1)* | | | *0.014(0)* |
| O(3)⁺ | 4f | ⅔ | ⅓ | 0.4165(6) | 0.015(1) |
| | | | | *0.4198(5)* | *0.023(2)* |

| Atom | $U_{11}$ | $U_{22}$ | $U_{33}$ | $U_{23}$ | $U_{13}$ | $U_{12}$ |
|---|---|---|---|---|---|---|
| Ba(1) | 0.0116(5) | $U_{11}$ | 0.0104(6) | 0 | 0 | ½ $U_{11}$ |
| | *0.0141(3)* | | *0.0163(6)* | | | |
| M(1)* | 0.0081(6) | $U_{11}$ | 0.0096(7) | 0 | 0 | ½ $U_{11}$ |
| | *0.0101(5)* | | *0.0111(6)* | | | |
| M(2)* | 0.0130(5) | 0.02327 | 0.0069(6) | 0.0016(3) | ½ $U_{23}$ | ½ $U_{22}$ |
| | *0.0162(6)* | *0.03357* | *0.0091(6)* | *0.0002(3)* | | |
| Fe(3) | 0.0067(8) | $U_{11}$ | 0.089(3) | 0 | 0 | ½ $U_{11}$ |
| Co(3) | *0.0053(7)* | | *0.042(1)* | | | |

*For $BaFe_{3.39(5)}Ru_{2.61(5)}O_{11}$: M(1) = 0.64(1)Fe, 0.36Ru; M(2) = 0.37(1)Fe, 0.63Ru, for $BaCo_{1.85(6)}Ru_{4.15(6)}O_{11}$: M(1) = 0.14(1)Co, 0.9Ru; M(2) = 0.22(1)Fe, 0.78Ru.
⁺refined with isotropic displacements parameters.

Two crystallographic positions are mixed-occupied by M and Ru in different ratios and surrounded octahedrally by O, localized in the centers of 10 of 24 available octahedral holes of the hexagonal packing (inclusive those formed with participation of Ba). In every third layer, ¾ of the octahedral holes are occupied by M(2) forming layers of edge-sharing octahedral. These layers are interconnected in the third dimension by $M(1)O_6$ octahedra, which share faces with the unoccupied octahedra within the layers. The $M(1)O_6$ octahedra themselves share faces, leading to pairs of octahedra. Within the layers with M(1) sites (two out of three layers) only ¼ of the octahedral holes are occupied. In this way, the pairs of octahedra are not directly interconnected, but are separated by the barium ions. As a remarkable feature of the structure, O(3) as a part of the close packing connects four octahedra via vertices, but does not coordinate to Ba. The crystal structure is completed by sites purely occupied by Fe or Co. These d-metal species are in a trigonal bipyramidal configuration surrounded by O (i.e., in voids of two face-sharing tetrahedra) located within the layer of the pairs of octahedra.

Earlier refinements based on powder diffraction data indicated small intermixing by Ru in this position, but the data presented do not indicate any increased electron density. In the refinement in space group $P6_3/mmc$, this transition metal atom is located on a mirror plane. Close inspection of the displacement parameters reveal elongation of the ellipsoid in the [001] direction and indicate a dislocation in the sense of a preference for a tetrahedrally-coordinated position rather than a five-fold coordinated site. Analyses of single crystal X-ray diffraction data collected on the Fe-containing crystal at 150 K did not give any indication of an enhancement of displacement of the Fe site in question.

In the exemplary compositions $BaFe_{3.39(5)}Ru_{2.61(5)}O_{11}$ and $BaCo_{1.85(6)}Ru_{4.15(6)}O_{11}$, different levels of occupation of the two sites M(1) ($Fe_{0.64(1)}$, $Ru_{0.36}$ or $Co_{0.10(1)}$, $Ru_{0.90}$) and M(2) ($Fe_{0.37(1)}$, $Ru_{0.63}$; $Co_{0.22(1)}$, $Ru_{0.78}$) with Ru and M=Fe, Co, as compared to literature reports, lead to compositions deviating from the ideal compositions $BaFe_2Ru_4O_1$ and $BaCo_2Ru_{4.01}$. Homogeneity ranges in the sense of $BaM_{2\pm x}Ru_{4\mp}O_{11}$ can be obtained. For M=Fe the composition from refinement of X-ray diffraction data results in $BaFe_{3.39(5)}Ru_{2.61(5)}O_{11}$, in contrast to an approximate composition of $BaFe_{2.7}Ru_{3.3}O_{11}$ from μ-probe.

Comparably small isotropic displacements parameters for the M(1) and M(2) position in the refinement of the diffraction data may suggest a somewhat higher occupation with Ru, also indicated by the fact that the result from μ-probe exactly matches the molar ratio used in the preparation. X-ray powder diffraction patterns showed only weak reflections of an unknown second phase (unit cell parameters from powder least squares refinements: a=5.830(1), c=13.5852(5) Å) and are strongly textured according to (001) as may be expected from the hexagonal platelet shape of the crystals.

As an important conclusion, the studied crystals clearly do not represent the composition $BaFe_2Ru_4O_{11}$, but contain a significantly higher molar ratio n(Fe)/n(Ru). However, for M'=Co the composition obtained from the structure refinements with $BaCu_{1.85(6)}Ru_{4.15(6)}O_{11}$ exactly matches the composition found from μ-probe with $BaCo_{1.8}Ru_{4.2}O_{11}$ and shows a minor but significant deviation from the ideal composition in direction of a smaller ratio n(Co)/n(Ru).

Distances between Ba and O are in the range expected for highly coordinated Ba. Distances d(M-O) are slightly shorter in the Co compound as compared to the Fe compound as a result of the higher occupation with Ru in high oxidation state in the Co compound. Distances d(Co(3)-O), however, are longer than d(Fe(3)-O) as one would expect for low oxidation state low spin atoms. Selected interatomic distances are shown in Table 3.

TABLE 3

Selected bond lengths: (Å) for $BaFe_{3.39(5)}Ru_{2.61(5)}O_{11}$ (first values) and $BaCo_{1.85(6)}Ru_{4.15(6)}O_{11}$ (second values, in italics) with estimated standard deviations in parentheses.

| Ba(1) | —O(1) | 2.836(3) | *2.825(3)* | 6 x |
|---|---|---|---|---|
|  | —O(2) | 2.932(3) | *2.926(3)* | 6 x |
| M(1) | —M(1) | 2.760(2) | *2.652(2)* | 1 x |
|  | —O(1) | 1.962(3) | *1.978(4)* | 3 x |
|  | —O(2) | 2.073(4) | *2.012(5)* | 3 x |
| M(2) | —O(1) | 1.996(2) | *1.984(3)* | 4 x |
|  | —O(3) | 2.036(4) | *2.003(4)* | 2 x |
| M(3) | —O(2) | 1.834(5) | *1.860(6)* | 3 x |
|  | —O(3) | 2.262(8) | *2.288(7)* | 2 x |

The distance d(Ru—Ru) within the pairs of octahedra is believed to be indicative of the oxidation state of ruthenium. For the present crystal structures, we have to consider the possibility of Ru in different oxidation states for sites M(1) (face-sharing octahedra) and M(2) (no face sharing) because intermediate as well as mixed valence situations have been observed for oxoruthenates. In the Fe-containing compound, the distance was refined to d(M(1)–M(1))=2.760(2) Å. This distance is located at the short end of the range for which one would expect an oxidation state of +5.5 for Ru. Within the frame of simple charge balance calculations, and provided that an oxidation state of +5 is valid for Ru on the M(2) site (no face sharing with other occupied octahedra) for the composition from structure refinements $BaFe_{3.39(5)}Ru_{2.61(5)}O_{11}$, this would lead to an oxidation state close to +2 for Fe. However, with an occupation of M(1) with 0.64(1) Fe and 0.36 Ru this distance is highly dominated by Fe—Fe and Fe—Ru contacts and does not necessarily give valuable information about pure Ru—Ru interactions. For $BaCo_{1.85(6)}Ru_{4.15(6)}O_{11}$ the situation is reversed: with an occupation of the site M(1) with 0.10(1) Co and 0.90 Ru the distance d(M(1)–M(1))=2.625(2) Å can be viewed as close to a pure Ru—Ru distance, but without any metal-metal bonding. This value is at the lower end expected for Ru in an oxidation state of +5. The charge balance then leads to Co close to +2 if M(2) contains Ru in the oxidation state +3. This result is in good agreement with the magnetic susceptibility data that is discussed hereafter.

Magnetic Properties

Figure 5:
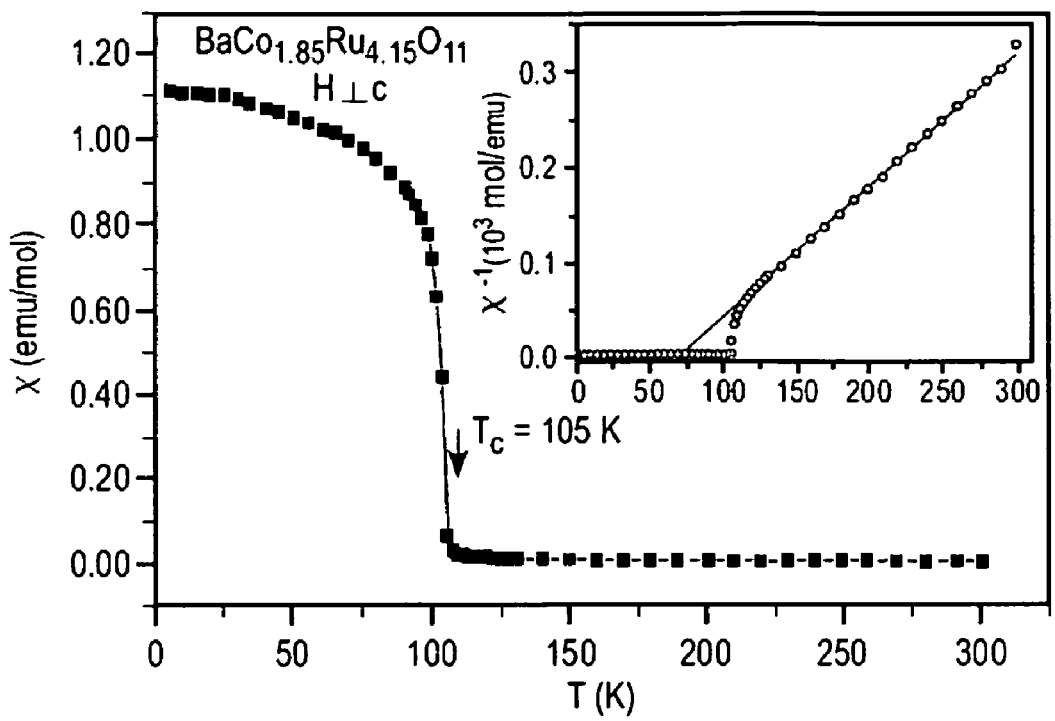
FIG. 5 shows the field-cooled (FC) dc-susceptibility in an external magnetic field, $\mu_0H$=0.05 T (H⊥c), for $BaCo_{1.85(6)}Ru_{4.15(6)}O_{11}$. The inset shows the inverse magnetic susceptibility vs. temperature. The solid line is a fit of the data to the Curie-Weiss law.
Figure 6:
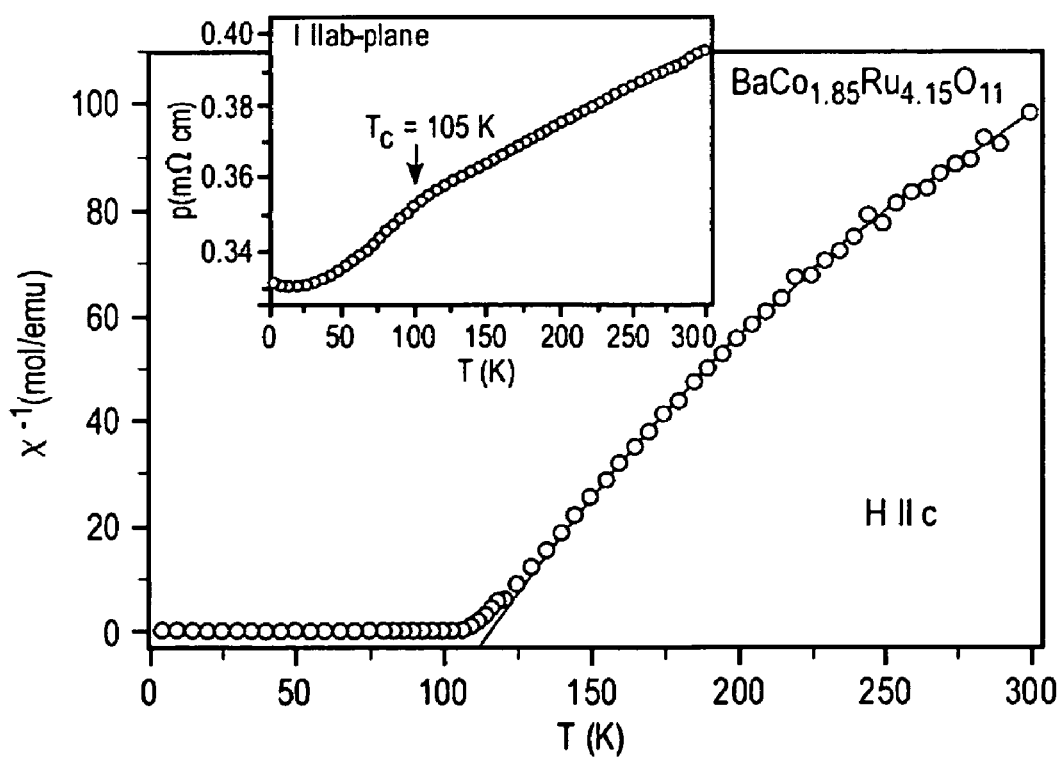
FIG. 6 shows the inverse magnetic susceptibility vs. temperature in an external magnetic field, $\mu_0H$=0.05 T (H//c), for $BaCo_{1.85(6)}Ru_{4.15(6)}O_{11}$. The inset shows the temperature dependence of the resistivity (I//ab-plane). The arrow designates the temperature of magnetic ordering at $T_c$=105 K.

The magnetic susceptibility measurements of a $BaCo_{1.85(6)}Ru_{4.15(6)}O_{11}$ single crystal reveal a spontaneous magnetization below $T_c$=105 K (FIG. 5). This material can be considered a soft ferromagnetic material with low coercive field. Both $BaCo_{1.85(6)}Ru_{4.15(6)}O_{11}$ and $BaFe_{3.39(5)}Ru_{2.61(5)}O_{11}$ contain ferromagnetically-aligned Co (Fe) and Ru moments, which leads to overall ferromagnetic order via superexchange through the oxygen atoms. As shown in the inset of FIG. 5, the inverse of the field-cooled (FC) dc-susceptibility (H⊥c) exhibits an abrupt change in slope above 100 K and a linear behavior above 120 K. A Curie-Weiss fit of the data in the temperature interval 120<T<300 K gives a Weiss constant $\theta_p$=70 K and an effective magnetic moment of 2.41 $\mu_B$. The susceptibility of the single crystal $BaCo_{1.85(6)}Ru_{4.15(6)}O_{11}$ is strongly anisotropic and is much higher for H//c. Above 150 K the susceptibility follows a modified Curie-Weiss law with a temperature-independent term $\chi_0$=3.8×10$^{-3}$ mol/emu, $\theta_p$=115 K, and $\mu_{eff}$=3.08 $\mu_B$ (FIG. 6). Fitting with a spatial average $\chi=(\chi_{//}+2\chi_\perp)/3$ of the Curie-Weiss law above 150 K yields $\mu_{eff}$=2.78 $\mu_B$.

Figure 7A:
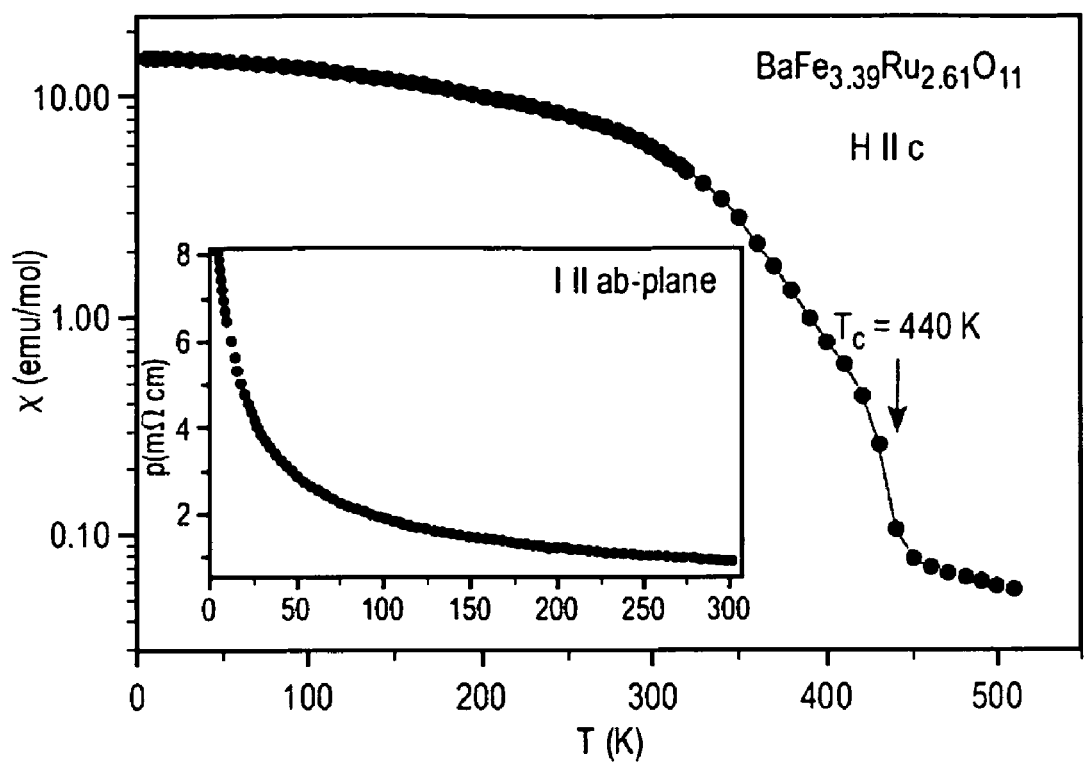
FIG. 7(a) shows the FC dc-susceptibility in an applied magnetic field $\mu_0H$=0.01 T (H//c), for $BaFe_{3.39(5)}Ru_{2.61(5)}O_{11}$. The inset shows the temperature dependence of the resistivity (I//ab-plane)

An estimation of the theoretical effective magnetic moment can be obtained using an expression $\mu_{eff}=[n_1\mu_B(Co^{2+})^2+n_2\mu_B(Ru^{3+})^2+n_3\mu_B(Ru^{5+})^2]^{1/2}$, where $n_1$, $n_2$ and $n_3$ are fractions of $Co^{2+}$, $Ru^{3+}$ and $Ru^{5+}$ moments per mol of material, respectively. Effective magnetic moments for spin-only $Ru^{3+}$ (S=½), $Ru^{5+}$ (S=3/2) and $Co^{2+}$ (S=½) yield a value of $\mu_{eff}$=2.81 $\mu_B$, which is in good agreement with the experimental result. This result can be taken as support for the previous oxidation state discussion. The temperature dependence of the FC dc-susceptibility of $BaFe_{3.39(5)}Ru_{2.61(5)}O_{11}$ shows that in this sample ferrimagnetism develops below $T_c$=440 K (FIG. 7(a)). Due to the very high Curie temperature of the compound, it was not possible to extract the parameters of magnetic interactions from a high temperature fit of the reciprocal susceptibility to the Curie-Weiss law.

Figure 7B:
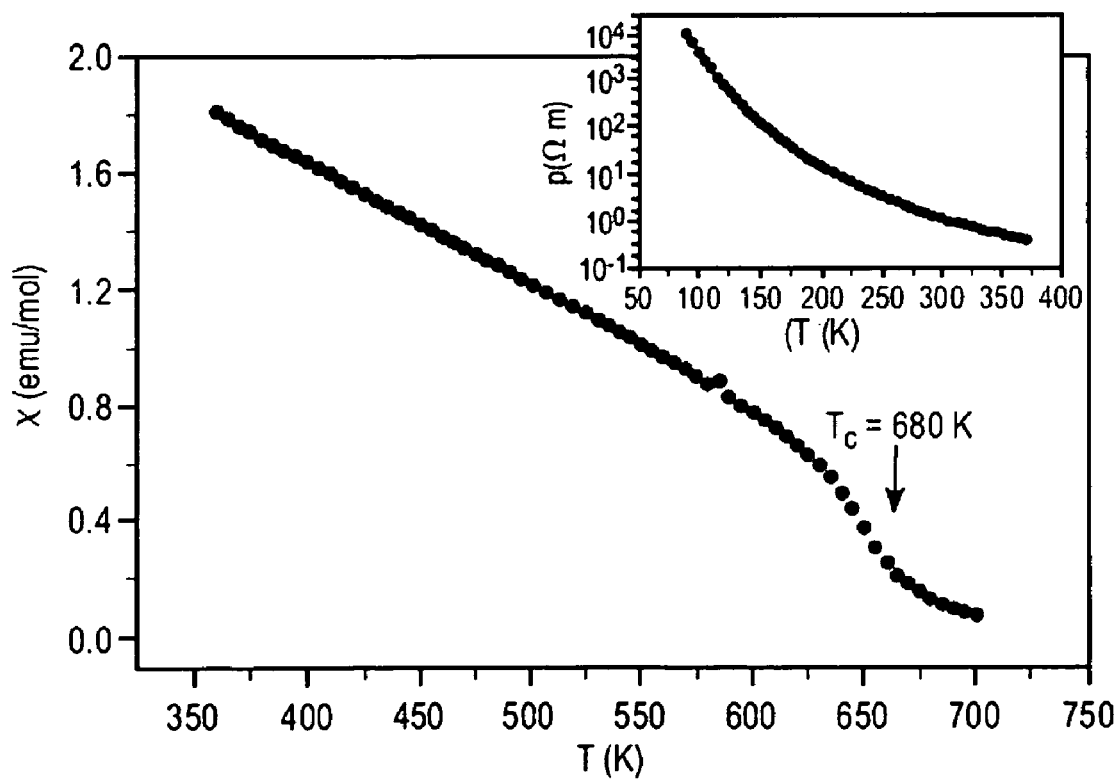
FIG. 7(b) is a plot of the FC dc-susceptibility in an applied magnetic field for $BaFe_{3.39(5)}Ru_{2.61(5)}O_{11}$. The inset shows the temperature dependence of the resistivity.
Figure 7C:
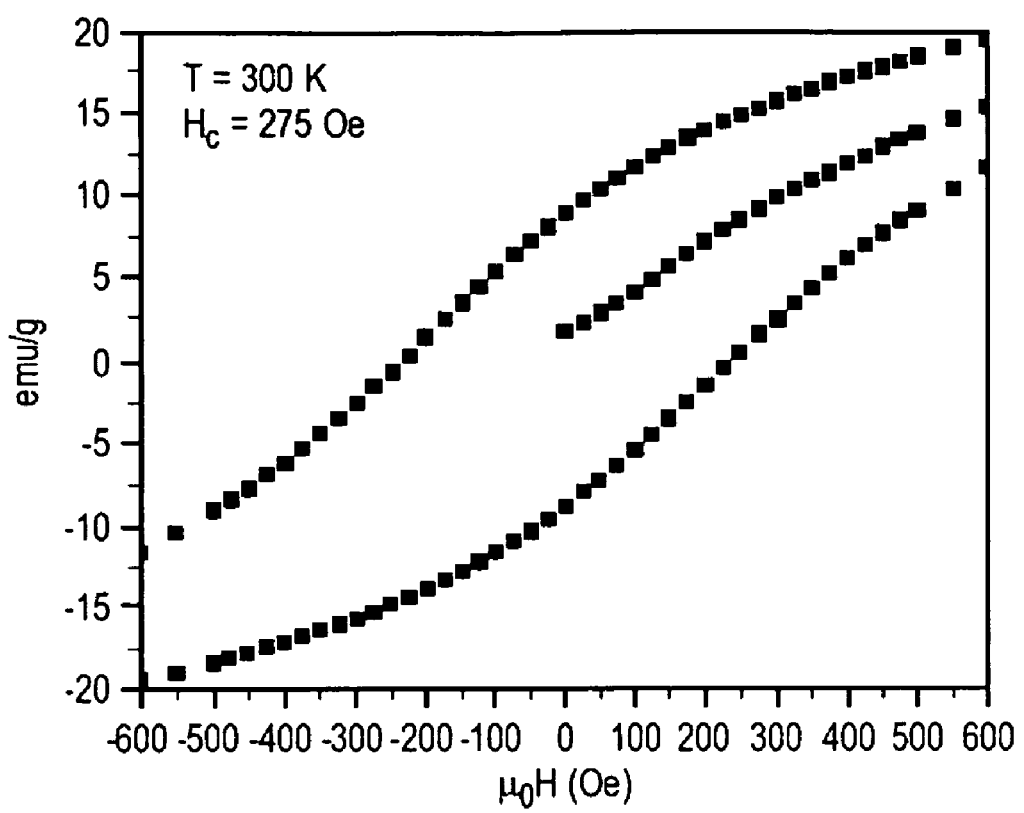
FIG. 7(c) is a plot of the magnetic moment vs. applied magnetic field, H, for $BaFe_{3.39(5)}Ru_{2.61(5)}O_{11}$.

As noted above, additional dc measurements on a sample having the composition $BaFe_{3.39(5)}Ru_{2.61(5)}O_{11}$ show semi-conducting behavior (approximate gap of 200 meV, and a coercive field at 300 K of about 275 Oe). These data are shown in FIGS. 7(b) and 7(c).

Figure 8A:
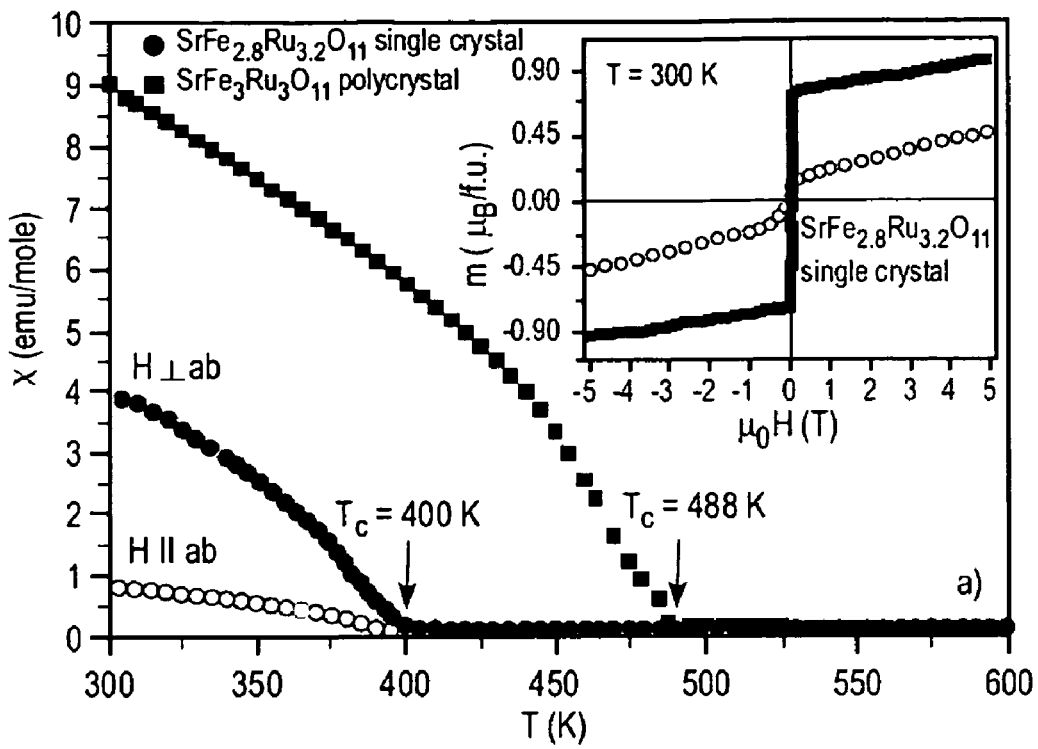
FIG. 8(a) shows the temperature dependence of the FC dc magnetic susceptibility $\chi(T)$ for single-crystal $SrFe_{2.8}Ru_{3.2}O_{11}$ for H//ab and H⊥ab plane at applied magnetic field $\mu_0H$=0.1 T. $\chi(T)$ for polycrystalline $SrFe_3Ru_3O_{11}$ is also shown. Inset shows the magnetic moment m vs. H at 300 K.
Figure 8B:
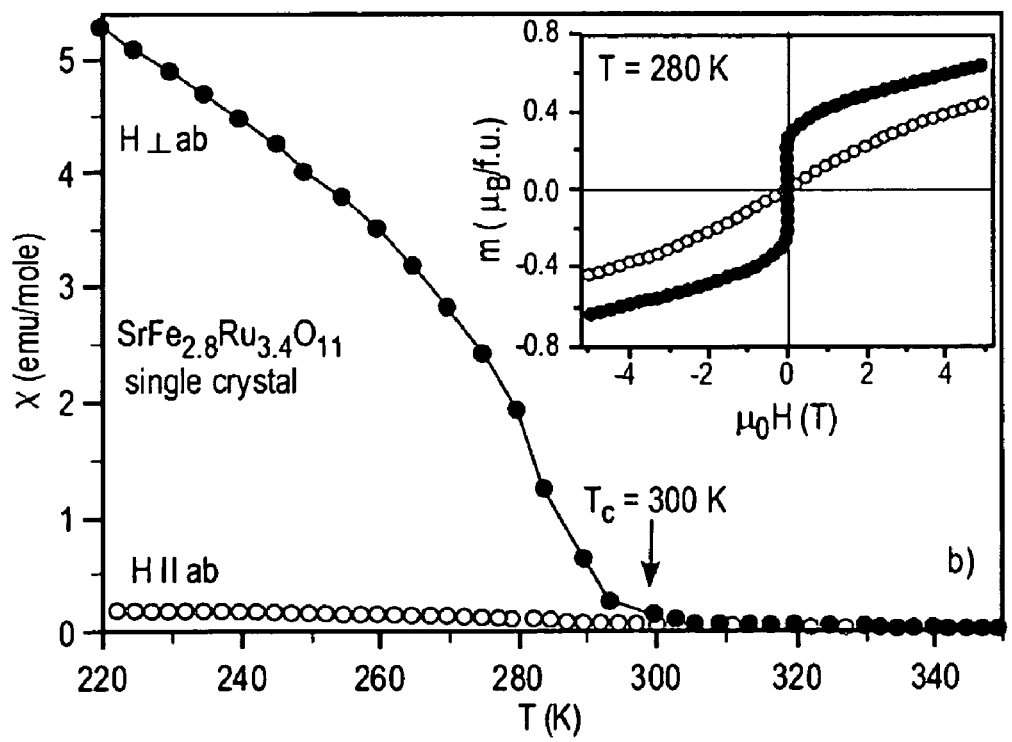
FIG. 8(b) shows the temperature dependence of the FC dc magnetic susceptibility for single-crystal $SrFe_{2.6}Ru_{3.4}O_{11}$ for H//ab and H⊥ab plane at applied magnetic field $\mu_0H$=0.1 T. Inset shows the magnetic moment m vs. H at 280 K.

The temperature dependences of the magnetic susceptibility X(T) of single-crystal $SrFe_{2.8}Ru_{3.2}O_{11}$ (FIG. 8(a)) and $SrFe_{2.6}Ru_{3.4}O_{11}$ (FIG. 8(b)) (H//ab and H⊥ab planes) reveal ferromagnetic (or possibly ferrimagnetic) transition anomalies at Curie temperatures $T_c$=400 and 300 K, respectively. These results indicate that the Curie temperature of the strontium ferrites strongly increases with higher iron content, which is verified by a very high $T_c$=488 K observed for polycrystalline $SrFe_3Ru_3O_{11}$ (FIG. 8(a)). The inset to FIG. 8(a) shows the magnetic moment m vs. H at 300K, and the inset to FIG. 8(b) shows m vs. H at 280K. The arrows designate the magnetic ordering temperature, $T_c$.

Low-field magnetization data reveal strong magnetization anisotropy $m_\perp/m_{//}\approx300$ for $SrFe_{2.6}Ru_{3.4}O_{11}$ at T=5 K, which indicates an easy axis perpendicular to the ab plane. M(H) curves exhibit typical ferrromagnetic hysteresis without saturation in fields of up to 5.5 T for both field directions. Small coercive fields $H_{c//}\approx H_{c\perp}$=10 Oe are observed for $SrFe_{2.6}Ru_{3.4}O_{11}$ at T=280 K, and modest anisotropy with $H_{c\perp}$=350 Oe and $H_{c//}$=500 Oe for $SrFe_{2.8}Ru_{3.4}O_{11}$ at T=300 K.

Figure 9:
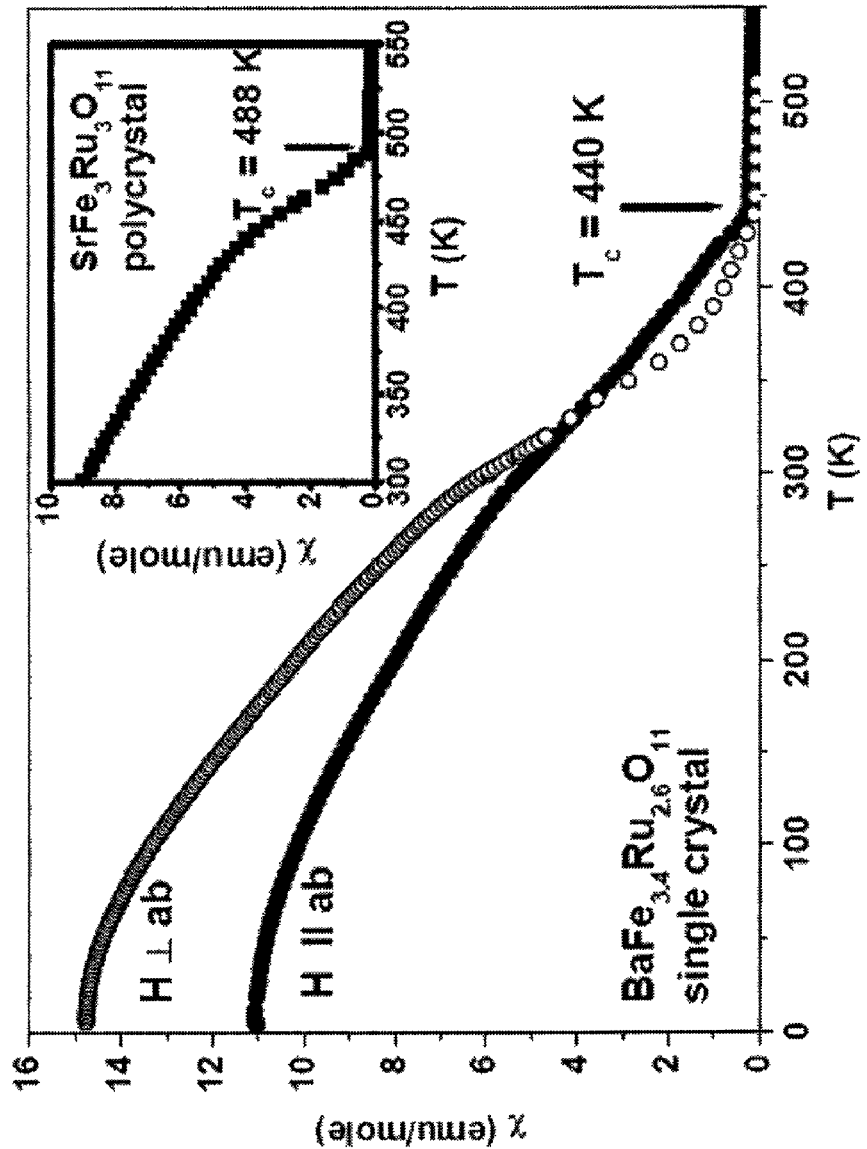
FIG. 9 shows the temperature dependence of the FC dc magnetic susceptibility for single-crystal $SrFe_{3.4}Ru_{2.6}O_{11}$ for H//ab and H⊥ab plane at applied magnetic field $\mu_0H$=0.1 T. Inset shows $\chi(T)$ for polycrystalline $SrFe_3Ru_3O_{11}$.
Figure 10A:
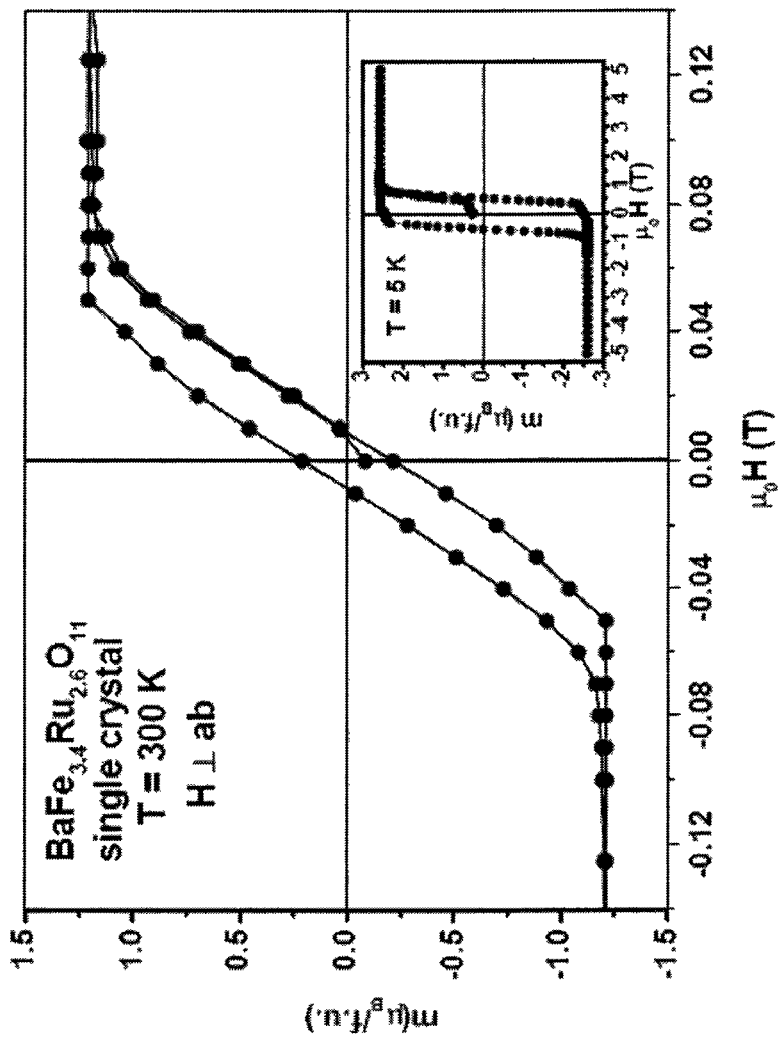
FIG. 10(a) is a plot of the low-field magnetic moment m vs. applied field H for single-crystal $BaFe_{3.4}Ru_{2.6}O_{11}$ at T=300 K with H//ab yielding a coercive field $H_{c\perp}$=92 Oe. Inset shows the moment ml vs. field (H⊥ab, easy direction) at 5 K.
Figure 10B:
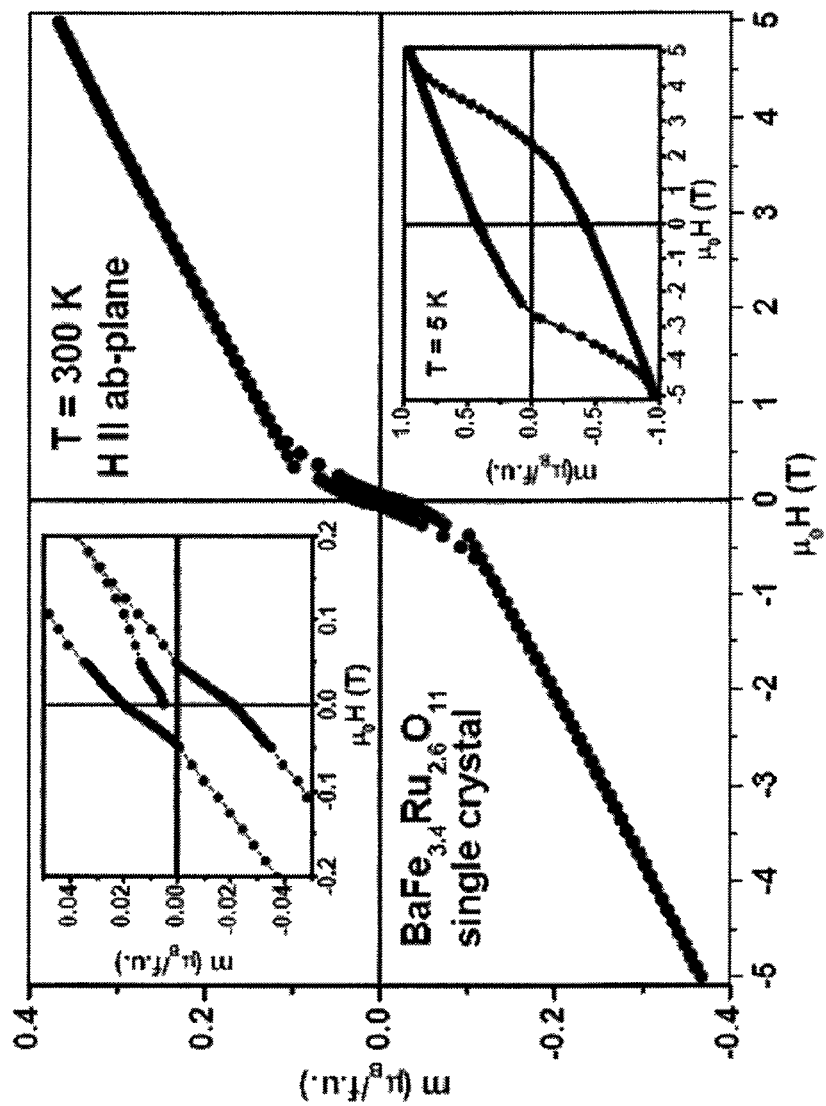
FIG. 10(b) is a plot of the moment $m_{//}$ vs. field (H//ab, hard direction) at 300 K. Insets show low-field magnetic hysteresis at T=300 K with H//ab yielding $H_{c//}$=480 Oe (upper left) and moment $m_{//}$ vs. field (H//ab) at 5 K (lower right)

Since the ionic radius of $Ba^{2+}$ is larger than that of $Sr^{2+}$, substitution of Ba for Sr results in an increase of lattice dimensions, and it is reasonable to expect that the magnetic interactions in a given barium ferrite are weaker than those of the strontium analog. Indeed, this expectation is borne out by the magnetic susceptibilities of single-crystal $BaFe_{3.4}Ru_{2.6}O_{11}$ ($T_c=440$ K) and polycrystalline $SrFe_3Ru_3O_{11}$ ($T_c=488$ K, with a similar composition) shown in FIG. 9. $BaFe_{3.4}Ru_{2.6}O_{11}$ is a soft ferromagnet with saturation moment $\mu_s=1.25$ $\mu_B$/f.u., and coercive fields $H_{c//}=480$ Oe and $H_{c\perp}=92$ Oe at T=300 K (FIGS. 10(a) and 10(b)). We observe more than two orders of magnitude reduction in magnetization anisotropy ($m_\perp m_//\approx 1.5$ at T=5 K) for $BaFe_{3.4}Ru_{2.6}O_{11}$ compared to $SrFe_{2.6}Ru_{3.4}O_{11}$.

Figure 11A:
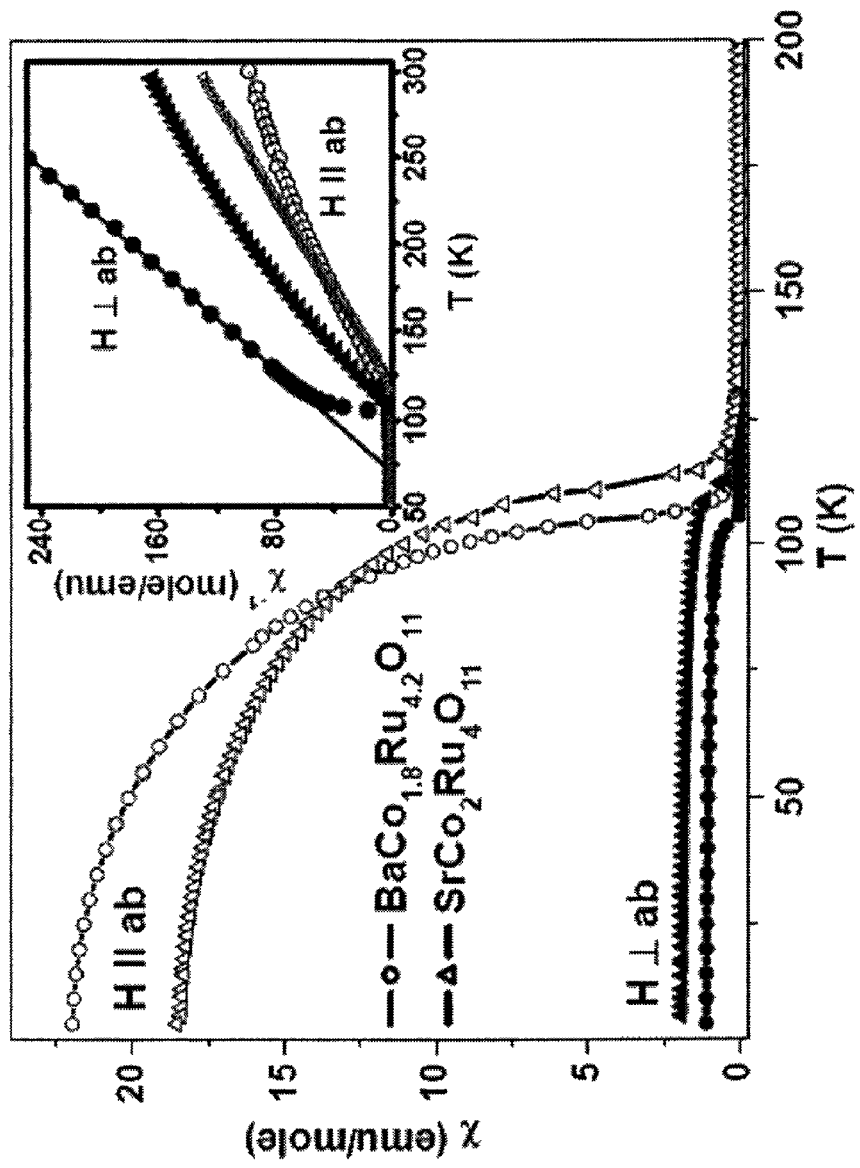
FIG. 11(a) is a plot of the temperature dependences of the magnetic susceptibilities $\chi(T)$ for $BaCo_{1.8}Ru_{4.2}O_{11}$ and $SrCo_2Ru_4O_{11}$ single crystals in an applied field H=500 Oe. Filled and unfilled symbols indicate H⊥ab and H//ab-plane, respectively. Inset shows the inverse magnetic susceptibilities $\chi^{-1}(T)$. Solid lines are fits to the Curie-Weiss law.
Figure 11B:
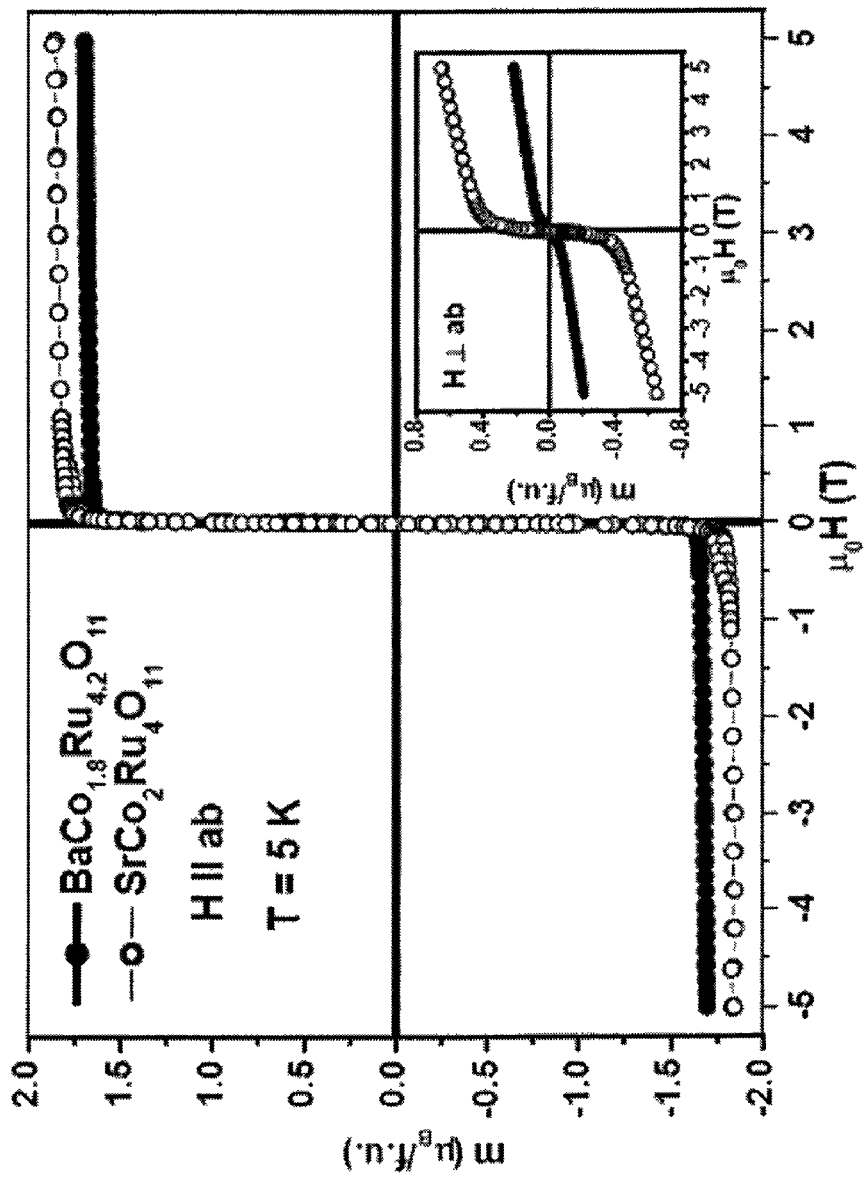
FIG. 11(b) is a plot of the moment $m_{//}$ vs. field (H//ab, easy direction) at 5 K for $BaCo_{1.8}Ru_{4.2}O_{11}$ and $SrCo_2Ru_4O_{11}$ single crystals. Inset shows the moment $m_\perp$ vs. field (H⊥ab, hard direction)

Substitutions of Co for Fe result in lower Curie temperatures, as shown by FC $\chi(T)$ data for $BaCo_{1.8}Ru_{4.2}O_{11}$ and $SrCo_2Ru_4O_{11}$ single crystals for which magnetic order develops below $T_c=105$ K and $T_c=115$ K, respectively (FIG. 11(a)). Above 150 K, both $BaCo_{1.8}Ru_{4.2}O_{11}$ and $SrCo_2Ru_4O_{11}$ follow modified Curie-Weiss laws having positive Weiss constants (Table 4), which is consistent with possible ferromagnetic interlayer and intralayer exchange couplings. Fitting with a spatial average $\chi=(\chi_{//}+2\chi_\perp)/3$ of the Curie-Weiss susceptibilities above 150 K yields effective magnetic moments, $\mu_{eff}=2.78$ $\mu_B$ ($BaCo_{1.8}Ru_{4.2}O_{11}$) and $u_{eff}=2.84$ $\mu B$ ($SrCo_2Ru_4O_{11}$), near the values 2.81 $\mu_B$ ($BaCo_{1.8}Ru_{4.2}O_{11}$) and 2.74 $\mu_B$ ($SrCo_2Ru_4O_{11}$) obtained using theoretical spin-only values for $Ru_{3+}$ (S=½), $Ru_{5+}$ (S=3/2) and $Co^{2+}$ (S=½). We found that the easy magnetization direction changes from axial to in-plane for $BaCo_{1.8}Ru_{4.2}O_{11}$ and $SrCo_2Ru_4O_{11}$. These compounds are very soft ferromagnets with saturation moments $\mu_s=1.8\pm0.1$ $\mu B$/f.u. at T=5 K (see Table 4 and FIG. 11(b)).

from an incompletely quenched orbital angular momentum of the relatively large Ru 4d-orbitals. A strong decrease in magnetic anisotropy is observed for larger substitutions of Fe for Ru, suggesting that the Fe/Ru ratio reduces the spin-orbit interaction responsible for the anisotropy. On the other hand, complete substitution of $Fe^{2+}$ ($3d^6$ electronic configuration) by $Co^{2+}$ ($3d^7$ electronic configuration), leads to an evolution of the easy axis from axial for $BaFe_{3.4}Ru_{2.6}O_{11}$ to planar for $BaCo_{1.8}Ru_{4.2}O_{11}$.

Figure 12:
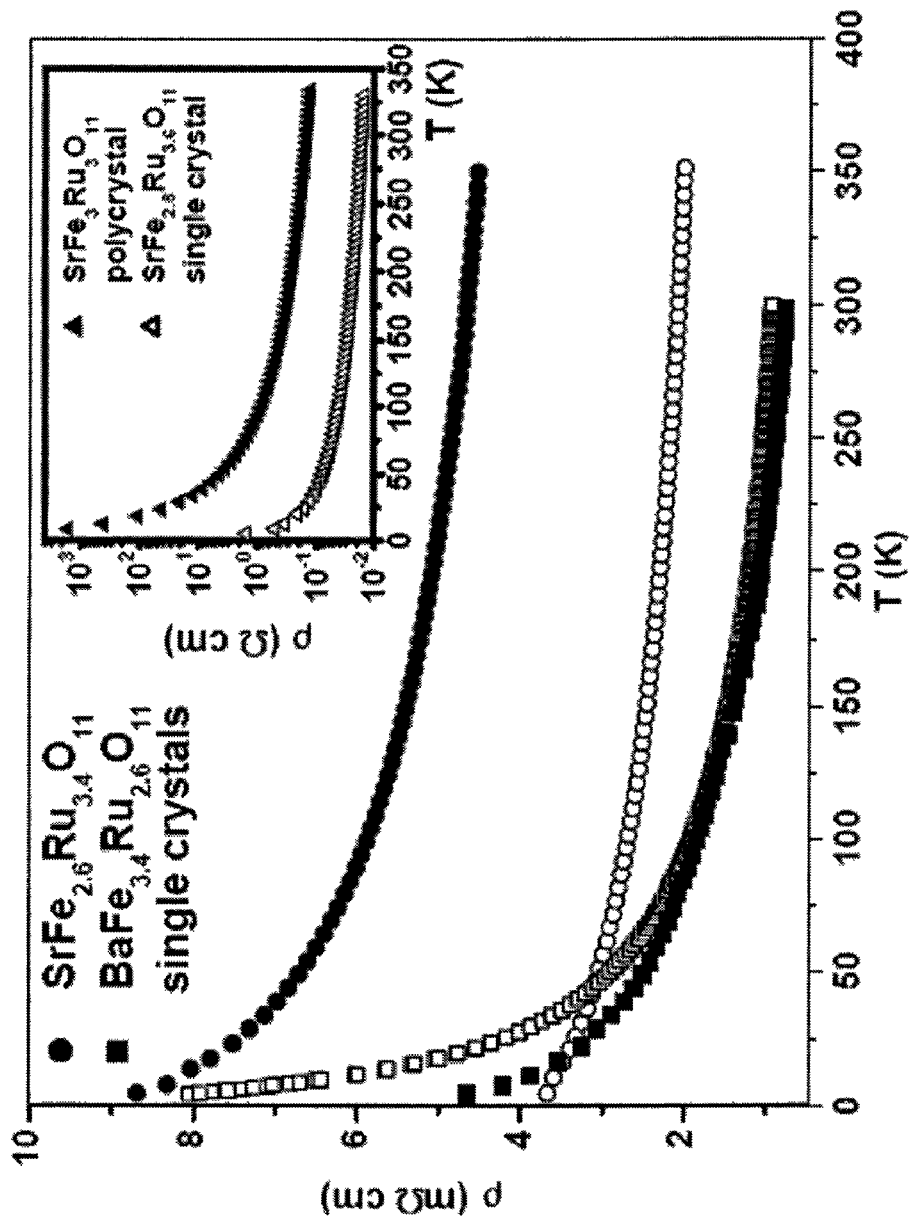
FIG. 12 is a plot of the temperature dependence of resistivity $\rho(T)$ for $BaFe_{3.4}Ru_{2.6}O_{11}$ and $SrFe_{2.6}Ru_{3.4}O_{11}$ single crystals. Filled and unfilled symbols correspond to electrical current I⊥ab, and I//ab, respectively. Inset shows $\rho(T)$ for polycrystalline $SrFe_3Ru_3O_{11}$ and single-crystal $SrFe_{2.8}Ru_{3.2}O_{11}$.

The temperature dependences of the resistivities $\rho(T)$ of the Fe-based barium- and strontium-ferrites are shown in FIG. 12; and the slopes $d\rho/dT<0$ indicate semiconductivity for all compositions. The in-plane resistivity of single-crystal $BaFe_{3.39}Ru_{2.61}O_{11}$ increases by one order of magnitude as the temperature falls from 300 to 5 K, while corresponding increases of about two and four orders of magnitude are observed for single-crystal $SrFe_{2.8}Ru_{3.2}O_{11}$ and polycrystalline $SrFe_3Ru_3O_{11}$, respectively. At temperatures above 180 K, $\rho(T)$ obeys an activated form $\rho=\rho_0 e^{\Delta/kT}$ with narrow gaps $\Delta\approx24$ (30) meV for current parallel ($\rho//$) or perpendicular ($\rho\perp$) to the ab-plane for single-crystal $BaFe_{3.39}Ru_{2.61}O_{11}$. In the case of the Sr analogues, $\Delta\approx36$ meV for parallel current in single-crystal $SrFe_{2.8}Ru_{3.2}O_{11}$, and we estimate an average $\Delta\approx59$ meV for polycrystalline $SrFe_3Ru_3O_{11}$. The fact that the resistivity of the polycrystalline sample is higher than the single crystals suggests that the resistance of the polycrystalline sample is dominated by carrier scattering at the grain boundaries.

TABLE 4

Magnetic parameters of Fe- and Co-containing ferrites

| Composition | $T_c$ (K) | $\mu_{eff}$ ($\mu_B$/f.u.) | $\theta_{p\perp}$ (K) | $\theta_{p//}$ (K) | $H_{c\perp}$ (Oe) | $H_{c//}$ (Oe) | $\mu_s$ ($\mu_B$/f.u.) | $m_\perp/m_{//}$ |
|---|---|---|---|---|---|---|---|---|
| $SrFe_{2.6}Ru_{3.4}O_{11}$ | 300 | | | | 10 (280K) | 10 (280K) | | 300 (5K) |
| $SrFe_{2.8}Ru_{3.2}O_{11}$ | 400 | | | | 350 (300K) | 500 (300K) | | 26 (5K) |
| $SrFe_3Ru_3O_{11}$* | 488 | | | | | | | |
| $SrCo_2Ru_4O_{11}$ | 115 | 2.84 | 106 | 122 | 150 (5K) | 30 (5K) | 1.9 (5K) | 0.1 (5K) |
| $BaFe_{3.4}Ru_{2.6}O_{11}$ | 440 | | | | 92 (300K) | 480 (300K) | 1.25 (300K) | 1.5 (5K) |
| $BaCo_{1.8}Ru_{4.2}O_{11}$ | 105 | 2.78 | 115 | 70 | 200 (5K) | 2 (5K) | 1.7 (5K) | 0.05 (5K) |

*polycrystalline sample; all others are single crystal.

Electric Conductivity

The different 3d- (Co, Fe) and 4d-metal (Ru) contents can be used to tailor the electronic properties. Our results indicate that the ratio of 3d- and 4d-magnetic-ions plays an important role in determining the Curie temperatures of strontium ferrites, and that a higher Fe/Ru ratio correlates with higher $T_c$.

Measurements of the electrical resistivity reveal that the Co-poor phase $BaCo_{1.85(6)}Ru_{4.15(6)}O_{11}$ is an electrical conductor (inset to FIG. 6), while the Fe-rich phase $BaFe_{3.39(5)}Ru_{2.61(5)}O_{11}$ is a narrow band semiconductor (inset to FIG. 7). The respective compounds with ideal compositions, $BaFe_2Ru_4O_{11}$ and $BaCo_2Ru_4O_{11}$, have both been described as poor metals, since they exhibit very weak semiconductor-like temperature dependence of the resistance in measurements taken on pressed pellets of microcrystalline material.

The difference in the resistivity behavior of the Co- and Fe-containing samples may be a consequence of different electronic structures of these metals. As a possible explanation, we suggest that the presence of an extra electron in $BaCo_{1.85(6)}Ru_{4.15(6)}O_{11}$ closes a gap at the Fermi surface of $BaFe_{3.39(5)}Ru_{2.61(5)}O_{11}$.

Materials with 3d magnetism tend to have low magnetic anisotropy and often exhibit soft magnetic behavior. Therefore, the high anisotropy of these compounds may originate The resistivity of single-crystal $SrFe_{2.6}Ru_{3.4}O_{11}$ (FIG. 12) between 300 and 4 K increases by only a factor of 2 and the estimated gap $\Delta\approx12$ (10) meV for current parallel perpendicular) to the ab-plane; nevertheless, the resistivity anisotropy is relatively large in $SrFe_{2.6}Ru_{3.4}O_{11}$ with $\rho\perp\approx\rho//$.

The apparent increases of the semiconducting gap and Curie temperature, and decrease of magnetic anisotropy with increasing Fe content suggest a close relationship exists between the character of magnetic interactions and the resistivity behavior.

For practical applications, it is highly desirable that the injection and detection of spin currents be electrical. The most direct method of spin injection in a heterostructure is to inject electrons from a ferromagnetic metal into a semiconductor, but the integration of spin-polarized currents into efficient semiconductor devices requires an interface between a non-magnetic semiconductor (S) and a room-temperature FS with minimal conductivity mismatch.

The room-temperature resistivities of single-crystal $BaFe_{3.4}Ru_{2.6}O_{11}$ and $SrFe_{2.6}Ru_{3.4}O_{11}$ are $\rho_{300}=9.3\times10^{-4}$ $\Omega\cdot cm$ and $2\times10^{-3}$ $\Omega\cdot cm$, respectively, which are low values and in the range of typical semiconductors (0.001-100 $\Omega\cdot cm$). We note that the magnitude of the room-temperature resistivity $\rho_{300}$ for polycrystalline $SrFe_3Ru_3O_{11}$ is about a factor of ten greater than found in a barium counterpart, and depends critically on the preparation procedure; values ranging from 0.03 to 0.1 Ω·cm may be found under various conditions of temperature and atmosphere.

Since the value of the room-temperature resistivities of both barium and strontium ferrites studied here are low and typical of semiconductors, these materials have potential to optimize the spin injection and detection efficiencies across a S/FS interface.

Figure 13:
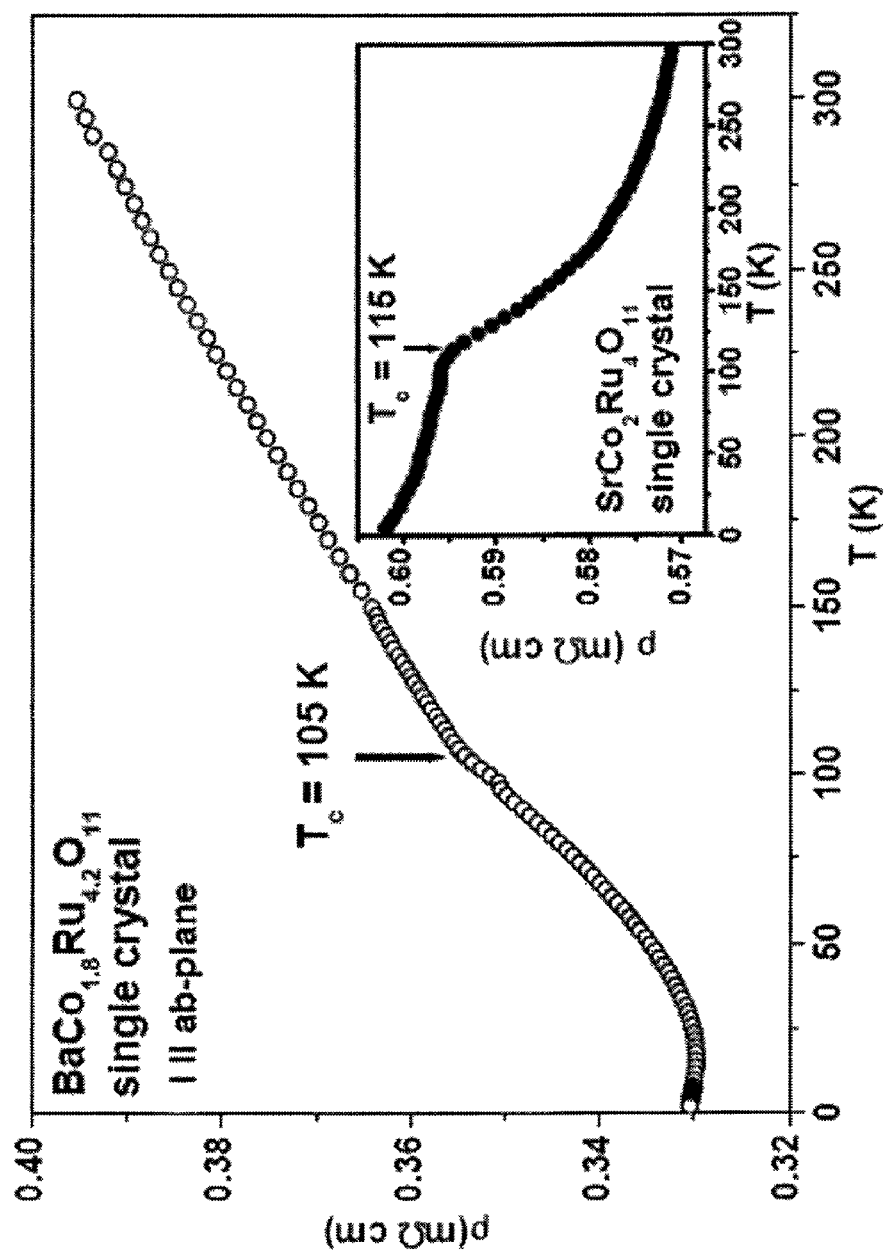
FIG. 13 is a plot of $\rho(T)$ for single-crystal $BaCo_{1.8}Ru_{4.2}O_{11}$ (I//ab). Inset shows $\rho(T)$ for single-crystal $SrCo_2Ru_4O_{11}$. Arrows designate the magnetic ordering temperature $T_c$.

The in-plane and out-of plane resistivities ($\rho_{//300}=3.9\times10^{-4}$ Ω·cm and $\rho_{\perp 300}=1.4\times10^{-4}$ Ω·cm, respectively) of single-crystal $BaCo_{1.8}Ru_{4.2}O_{11}$ differ from the Fe analogues in that they are metallic (d$\rho$/dT>0) (FIG. 13). The residual resistivities are large (of order 300 μΩ·cm), indicating $\rho(T)$ is strongly affected by the Ru/Co disorder in the sample. The ferromagnetic phase transition is marked by a small drop-off of $\rho(T)$ at ~105 K. Above 105 K, the in-plane resistivity displays a strong linear temperature dependence. This behavior is similar to one of the defining characteristics of high-temperature cuprate superconductors, and is considered a signature of strongly correlated or marginal Fermi liquid physics.

The resistivity of single-crystal $SrCo_2Ru_4O_{11}$ differs by rising with changing slope as temperature decreases below $T_c$. The estimated gap is very small (~1.1 meV) and is reduced below the magnetic ordering temperature. The differences in electron transport between Co- and Fe-containing ferrites might be attributed to the stronger hybridization of $Co^{2+}$ ($3d^7$) and mixed $Ru^{3+}/Ru^{5+}$ ($4d^5/4d^3$) states via superexchange through the oxygen $O^-$ 2p-orbitals in $BaCo_{1.8}Ru_{4.2}O_{11}$. This leads to a wider conduction band relative to $BaFe_{3.4}Ru_{2.6}O_{11}$, in which $Fe^{2+}$ is in a $3d^6$ configuration with one less electron. On the other hand, $SrCo_2Ru_4O_{11}$ exhibits a higher $T_c$ and remains a semiconductor with a very narrow gap, compared to metallic $BaCo_{1.8}Ru_{4.2}O_{11}$.

Figure 14:
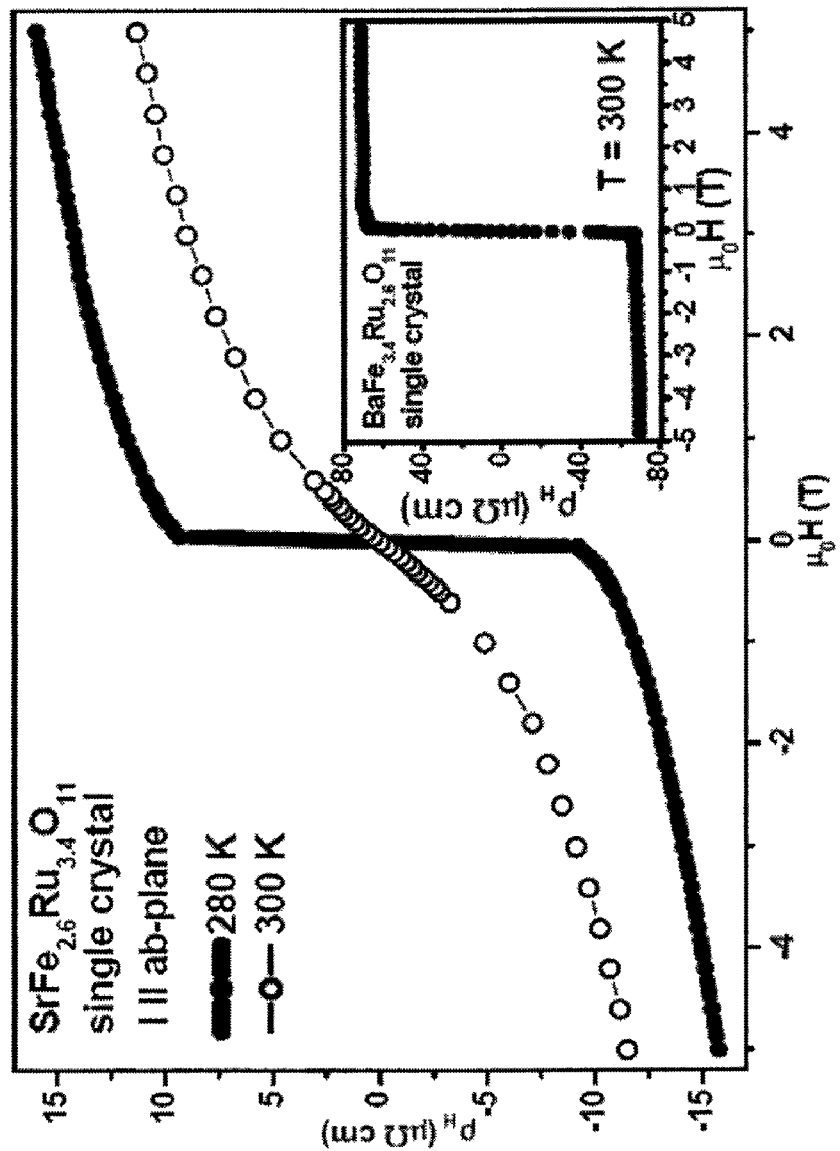
FIG. 14 is a plot of magnetic field dependence of the Hall resistivity $\rho_H(H)$ for single-crystal $SrFe_{2.6}Ru_{3.4}O_{11}$ at 280 and 300 K. The sharp change in slope at 0.1 T (anomalous Hall effect) is evidence of electron spin-polarization. Inset shows $\rho_H(H)$ for single-crystal $BaFe_{3.4}Ru_{2.6}O_{11}$ at T=300K.

Hall coefficient measurements reveal the predominant charge carriers in single-crystal $BaFe_{3.4}Ru_{2.6}O_{11}$ and $SrFe_{2.6}Ru_{3.4}O_{11}$ are holes (FIG. 14). The Hall resistivity in ferromagnets $\rho_H = R_0 H + 4\pi M R_s$, where $R_0$ is the Hall coefficient resulting from the Lorentz force on the carriers, and $R_S$ is the anomalous Hall coefficient that is dependent upon the magnetization and spin-orbit coupling. Therefore, $\rho_H$ has roughly the same field dependence as the magnetization in ferromagnets below $T_c$. This behavior is demonstrated by single-crystal $BaFe_{3.4}Ru_{2.6}O_{11}$ and $SrFe_{2.6}Ru_{3.4}O_{11}$ in FIG. 14, which shows $\rho_H$ has a large field dependence for H<<1.0 T and $T \leq T_c$, where the anomalous contribution dominates. This is highly suggestive of a strong, net electron-spin polarization that is requisite for an ideal FS injecting contact.

For $BaFe_{3.4}Ru_{2.6}O_{11}$ above 1.0 T, the magnetization saturates and $\rho_H$ becomes much less field dependent with $d\rho_H/dH=R_0=1/nec$, where e is the electron charge, c is the speed of light, and n is the carrier concentration. The slope of the $\rho_H$–H curve at T=300 K and $\mu_0 H>1.0$ T yields $n \approx 2\times10^{21}$ cm$^{-3}$ with mobility $\mu_H = R_0/\rho \approx 4$ cm$^2$ V$^{-1}$s$^{-1}$. The anomalous contribution to the Hall effect of $BaFe_{3.4}Ru_{2.6}O_{11}$ at T=300 K is ≈70 μΩ·cm, which is much larger than those of metallic or semiconducting ferromagnets such as (Ga,Mn)As and FeCoSi. We have found that the anomalous term of $SrFe_{2.6}Ru_{3.4}O_{11}$ remains quite sizeable at $T_c$. An extension of the anomalous term to temperatures above $T_c$ is also observed in other ferromagnetic semiconductors such as (GaMn)As, and may be indicative of short-range magnetic order.

Figure 15:
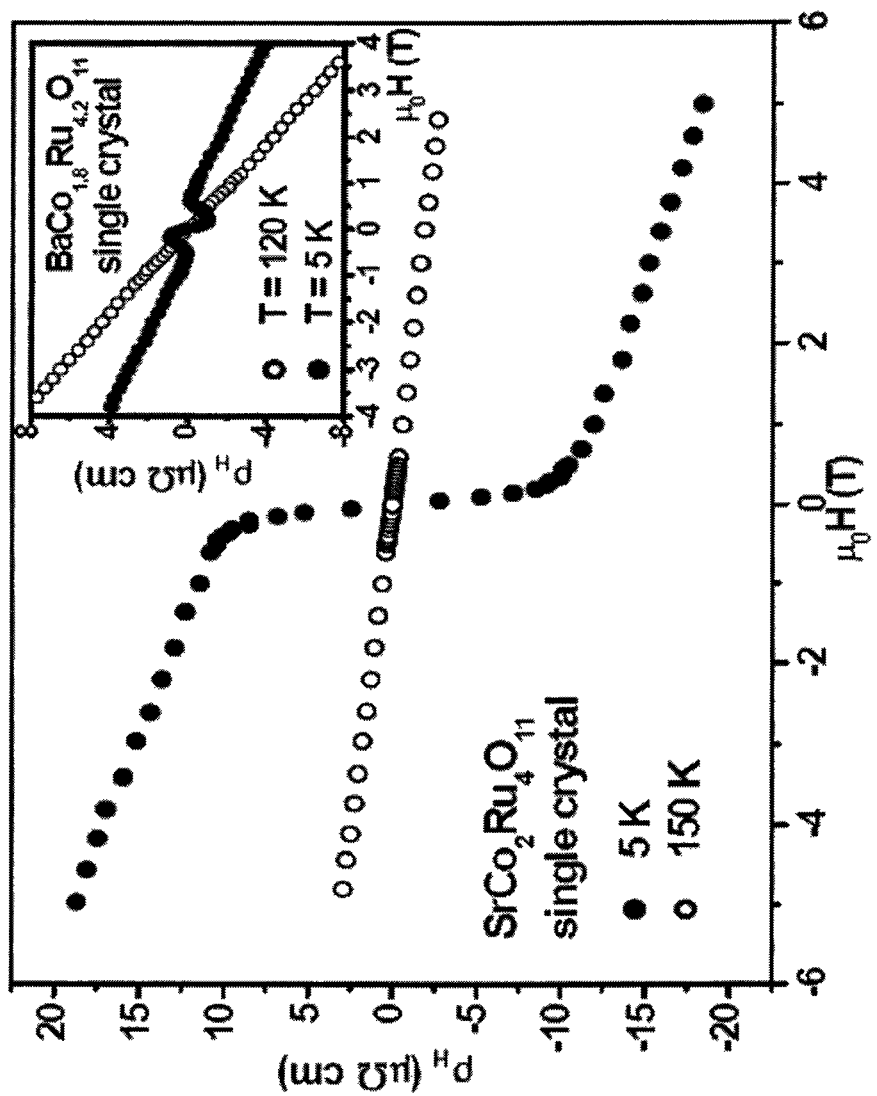
FIG. 15 is a plot of $\rho_H(H)$ for single-crystal $SrCo_2Ru_4O_{11}$ at T=150 and 5 K. Inset shows $\rho_H(H)$ for single-crystal $BaCo_{1.8}Ru_{4.2}O_{11}$ at 5 K (below $T_c$) and at 120 K (above $T_c$). Note the anomalous contribution vanishes at T=120 K.

The Hall effects observed for single-crystal $BaCo_{1.8}Ru_{4.2}O_{11}$ and $SrCo_2Ru_4O_{11}$ are distinctly different from the Fe-based ferrites, as is apparent in FIG. 15. The negative slope of $\rho_H(H)$ indicates that the dominant charge carriers are electrons in the Co-analogues, and there is a two order-of-magnitude difference between the low-field $\rho_H$ of the $BaFe_{3.4}Ru_{2.6}O_{11}$ and $BaCo_{1.8}Ru_{4.2}O_{11}$ samples at 5 K. No anomalous Hall signal is observed at $T>T_c$, and $\rho_H$ varies linearly with magnetic field for the Co-analogues. A carrier concentration n t $3\times10^{20}$ cm$^{-3}$ and mobility $\mu_H \approx 55$ cm$^2$V$^{-1}$s$^{-1}$ can be estimated from the ordinary Hall coefficient at T=120 K for $BaCo_{1.8}Ru_{4.2}O_{11}$, while $n \approx 1\times10^{21}$ cm$^{-3}$ and $\mu_H \approx 2.8$ cm$^2$ V$^{-1}$s$^{-1}$ at 150 K for $SrCo_2Ru_4O_{11}$.

An especially attractive characteristic of ternary ruthenium ferrites is that the magnetic and electrical properties of these materials can be widely varied by exchange of Fe with Ru over a homogeneity range $(Ba,Sr)Fe_{2\pm x}Ru_{4\mp x}O_{11}$, or Co for Fe within $(Ba,Sr)(Fe_{1-y}Co_y)_{2\pm x}Ru_{4\mp x}O_{11}$ solid solutions. In both cases, the substitution of $Fe^{2+}/Fe^{3+}$ for $Ru^{3+}/Ru^{5+}$ or $Fe^{2+}/Fe^{3+}$ for $Co^{2+}$ can be used to control the ferromagnetic and transport properties. In one embodiment, the invention relates to a composition represented by the general formula

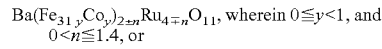
$Ba(Fe_{3 1-y}Co_y)_{2\pm n}Ru_{4\mp n}O_{11}$, wherein $0 \leq y<1$, and $0<n \leq 1.4$, or

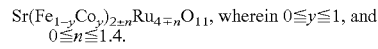
$Sr(Fe_{1-y}Co_y)_{2\pm n}Ru_{4\mp n}O_{11}$, wherein $0 \leq y \leq 1$, and $0 \leq n \leq 1.4$.

Figure 16:
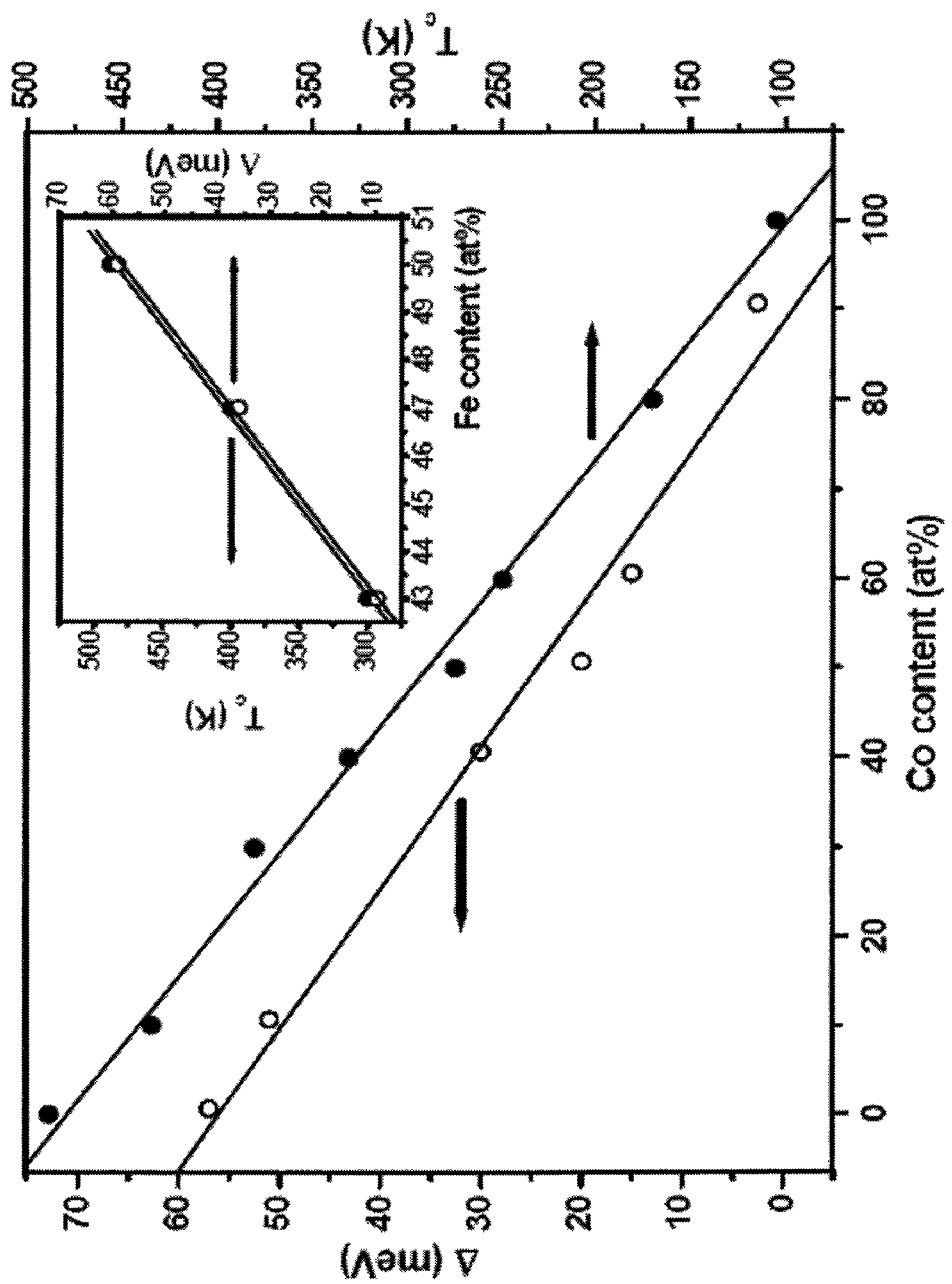
FIG. 16 is a plot of cobalt concentration dependence of the Curie temperature $T_c$ and semiconducting gap Δ for polycrystalline $Sr(Fe_{1-y}Co_y)_{2\pm x}Ru_{4\mp x}O_{11}$ solid solutions having nominal compositions $0\leq y\leq 1$, x=0. The inset shows Fe concentration dependence of $T_c$ and Δ for $SrFe_{2+x}Ru_{4-x}O_{11}$ (x=0.6, 0.8 single crystals, x=1 polycrystal). Solid lines are linear fits to the data.

These compositional degrees of freedom allow us to study the fundamental physics behind the magnetic and electric properties over a wide compositional range without any accompanying structural changes. For example, the Co- or Fe-concentration dependences of $T_c$ and the gap $\Delta$ of polycrystalline $Sr(Fe_{1-y}Co_y)_{2\pm x}Ru_{4\mp x}O_{11}$ and single-crystal $SrFe_{2\pm x}Ru_{4\mp x}O_{11}$, are shown in FIG. 16.

Increases of the $Co^{2+}$ ($3d^7$) concentration produce a continuous evolution from a high-temperature, p-type FS to a ferromagnetic metal. More importantly, these data demonstrate that the wider the semiconducting gap the higher the temperature of magnetic ordering. This intriguing trend is opposite to that observed for diluted magnetic semiconductors, where an increase in carrier concentration leads to higher $T_c$, but also to higher metallicity. The origin of this unique phenomenon in ferrites is not clear at present, but we believe it is an important clue concerning the mechanism of high-temperature ferromagnetism in these materials.

Ternary ruthenium ferrites offer a new paradigm for spintronics. $(Ba,Sr)(Fe_{1-y}Co_y)_{2\pm x}Ru_{4\mp x}O_{11}$ are narrow-gap semiconductors with Curie temperatures at or above room temperature. The wide homogeneity ranges accessible via different 4d/3d-transition element compositions allow one to engineer desirable electrical transport properties and tune the strength of ferromagnetic interactions, anisotropy and $T_c$ within a single structure type. Moreover, it is important to have materials that can form heterostructures with a good lattice match, since lattice mismatch typically leads to low-quality interfaces that are detrimental to spin polarized transport.

Isostructural $(Ba,Sr)(Fe_{1-y}Co_y)_{2\pm x}Ru_{4\mp x}O_{11}$ solid solutions and the homogeneity range of $(Ba,Sr)Fe_{2\pm x}Ru_{4\mp x}O_{11}$ and $(Ba,Sr)Co_{2\pm x}Ru_{4\mp x}O_{11}$ provide a highly desirable situation in which the maximal lattice mismatch between the end members of these solutions does not exceed 0.2%. These novel materials therefore might be exploited to grow epitaxial thin films having different electrical and magnetic properties to form heterostructures for multifunctional devices in which the contributions of both electrons and holes play important roles.

EXPERIMENTAL

Sample Preparation

For preparation of $BaFe_{3.39(5)}Ru_{2.61(5)}O_{11}$, 11.3 mmol $BaCo_3$, 3.40 mmol $RuO_2$ and 1.39 mmol $Fe_2O_3$ were mixed with about 1.5 g of $BaCl_2$, which was used as an agent to initiate crystal growth. The resulting powders were heated to 1350° C. and kept at this temperature for 70 hr. Then the furnace was slowly cooled (~50° C./hr.) to room temperature. Black, hexagonal, single-crystalline platelets with maximal sizes of 2 mm and a thickness of about 0.05 mm were obtained.

Starting materials for $BaCo_{1.85(6)}Ru_{4.15(6)}O_{11}$ were 11.3 mmol $BaCO_3$, 3.40 mmol $RuO_2$, and 1.30 mmol $Co_3O_4$. After addition of $BaCl_2$, this mixture was treated in the identical manner as for the Fe compound.

Single crystal samples of $SrFe_{2.6}Ru_{3.4}O_{11}$ were prepared by mixing 0.26 mol. % $Fe_2O_3$, 0.52 mol. % $RuO_2$ and 0.39 mol. % $SrCl_2$. The powder mixture was heated in air at ambient pressure to 1300° C. and kept at this temperature of 50 hr. The furnace was cooled to 1000° C. for 4 hr. and then switched off.

Polycrystals of $SrFe_3Ru_3O_{11}$ were synthesized by heating a mixture of stoichiometric amounts of $SrCO_3$, $RuO_2$ and $Fe_2O_3$ to 1190° C. for 15 hr. The furnace was cooled to room temperature at a rate of 100° C./hr.

Structure Determination

For X-ray diffraction intensity data collection, small black crystals with the shape of hexagonal platelets were selected. The measurements were performed on an Oxford Xcalibur diffractometer equipped with a Graphite monochromator and a Sapphire CCD area detector at ambient temperature using $MoK_\alpha$ radiation [Scans: Fe: $\phi$ (360 images, $\Delta\phi$=1.0°, 5 s), $\omega$ (416 images, $\Delta\omega$)=1.0°, 5 s), Co: $\phi$ (180 images, $\Delta\phi$=2.0°, 30 s), $\omega$ (208 images, $\Delta\omega$=2.0°, 30 s)].

The crystal of the Fe phase was additionally measured at 150 K to track a possible displacive phase transition to a non-centrosymmetric crystal structure. After empirical absorption correction, the structure solutions were successful with direct methods in space group $P6_3/mmc$ (No. 194, centrosymmetric, program SHELXS-97-2). In the refinement procedure, oxygen atoms were chosen to be treated with isotropic displacement parameters due to limited number of unique intensity data (SHELXL-97-2). Selected information on the data collections, structure determinations and refinements is presented in Table 1. Table 2 gives positional parameters, site occupation numbers and displacement parameters.

Chemical Composition Determination

Chemical µ-probe analyses (JEOL 5900LV operating at 20 kV and equipped with a LINK AN 10000 detector system for EDX analysis) resulted in very stable compositions both for several different points on each investigated crystal, and for different crystals with the exact ratio n(M)/n(Ba)=6.0 for each measurement (average of 47 at. % Ru, 39 at. % Fe and 14 at. % Ba for $BaFe_{3.39(5)}Ru_{2.61(5)}O_{11}$; 60 at. % Ru, 11 at. % Co and 14 at. % Ba for $BaCo_{1.85(6)}Ru_{4.15(6)}O_{11}$). This result also applies for the same crystals measured on the diffractometer. No reliable quantification of the oxygen content is possible with this technique. No further elements were detected.

Magnetic Susceptibility and Electric Conductivity Measurements

The magnetic susceptibility $\chi(T)$ of orientated single crystals was measured between 2 K and 600 K in fields up to 5 T in a commercial SQUID magnetometer (Quantum Design). The electrical resistivity and Hall effect of the samples was measured in the temperature interval 1.8-300 K by using the four-probe dc method.

Although exemplary embodiments have been described above as heating single crystals materials to 1300° C., the temperature can range can be between 1280-1350° C. For polycrystalline materials, the temperature range can be between 1150-1300° C. The synthesis of these materials can be conducted in air or in a nitrogen atmosphere.

Although exemplary embodiments have been described above with particular compositions, it should be recognized that some elements can be substituted while still maintaining the above-described properties. For example, Mn can be substituted for Co or Fe, with the composition of $BaMn_2Ru_4O_{11}$ with a $T_c$=200 K. Another compound could be $SrRu_2Cr_3FeO_{11}$ with a $T_c$=148 K. Moreover, Ru could be substituted with Ti or Sn. For example, $BaTi_2Fe_4O_{11}$ and $SrTi_2Fe_4O_{11}$ with a $T_c$ of approximately 200 K, and $BaSn_2Fe^4O_{11}$ with a $T_c$=180 K.

The foregoing disclosure, including the drawings, has been set forth merely to illustrate the invention and is not intended to be limiting. Since modifications, combinations and subcombinations of the disclosed embodiments incorporating the spirit and substance of the invention may occur to persons skilled in the art, the invention should be construed to include everything within the scope of the appended claims and equivalents thereof.

What is claimed is:

1. A spintronic component, comprising a ferromagnetic semiconductor material in the form of an epitaxial thin film and having a composition represented by the general formula: $(Ba_z,Sr_{1-z})Fe_xCo_yRu_{6-(x+y)}O_{11}$, wherein $0 \leq x \leq 5$, $0 \leq y \leq 5$, $1 \leq (x+y) \leq 5$ and $0 \leq z \leq 1$, and when z=1 then x≠0.

2. A component according to claim 1, wherein x=0, or y=0, and when x=0 then z≠1.

3. A component according to claim 2, wherein the composition represented by the general formula: $BaM_{2\pm n}Ru_{4\mp n}O_{11}$, wherein M=Fe and $0<n \leq 1.4$, or $SrM_{2\pm n}Ru_{4\mp n}O_{11}$, wherein M=Fe or Co and $0 \leq n \leq 1.4$.

4. A component according to claim 1, wherein the semiconductor material is monocrystalline.

5. A component according to claim 1, wherein the semiconductor material is polycrystalline.

6. A component according to claim 1, wherein the semiconductor material has a Curie temperature greater than or equal to about 300 K.

7. A spintronic component, comprising a ferromagnetic semiconductor material in the form of an epitaxial thin film and having a composition represented by the general formula: $Ba(Fe_{1-y}Co_y)_{2\pm n}Ru_{4\mp n}O_{11}$, wherein $0 \leq y < 1$, and $0 < n \leq 1.4$, or $Sr(Fe_{1-y}Co_y)_{2\pm n}Ru_{4\mp n}O_{11}$, wherein $0 \leq y \leq 1$, and $0 \leq n \leq 1.4$.

8. A method of making a ferromagnetic semiconductor material, comprising:
forming a mixture comprising about 11.3 mmol $BaCO_3$, 3.4 mmol $RuO_2$, 1.39 mmol $Fe_2O_3$ and 1.5 g $BaCl_2$;
heating the mixture to about 1350° C. for about 70 hours; and
cooling the mixture to room temperature to form the semiconductor material.

9. A method of making a ferromagnetic semiconductor material, comprising:
forming a mixture comprising about 11.3 mmol $BaCO_3$, 3.4 mmol $RuO_2$, 1.30 mmol $Co_3O_4$ and 1.5 g $BaCl_2$;
heating the mixture to about 1350° C. for about 70 hours; and
cooling the mixture to room temperature to form the semiconductor material.

10. A method of making a single crystal ferromagnetic semiconductor material, comprising:
forming a mixture comprising about 0.26 mol.% $Fe_2O_3$, 0.52 mol. % $RuO_2$, 0.39 mol. % $SrCl_2$;
heating the mixture in air to about 1300° C. for about 50 hours;

then heating the mixture in air at about 1000° C. for 4 hours; and cooling the mixture to room temperature to form the semiconductor material.

11. A ferromagnetic semiconductor material having a composition represented by the general formula: $SrFe_xCo_yRu_{6-(x+y)}O_{11}$, wherein $0 \leq x \leq 5$, $0 \leq y \leq 5$, $1 \leq (x+y) \leq 5$.

12. A ferromagnetic semiconductor material according to claim 11, wherein x=0 or y=0.

13. A ferromagnetic semiconductor material having a composition represented by the general formula: $BaM_{2\pm x}Ru_{4\mp x}O_{11}$, wherein $0 < x \leq 1.4$ and M=Fe or $SrM_{2\pm x}Ru_{4\mp x}O_{11}$, wherein $0 \leq x \leq 1.4$ and M=Fe or Co.

14. A ferromagnetic semiconductor material having a composition represented by the general formula: $Ba(Fe_{1-y}Co_y)_{2\pm x}Ru_{4\mp x}O_{11}$, wherein $0 < x \leq 1.4$ and $0y<1$, or $Sr(Fe_{1-y}Co_y)_{2\pm x}Ru_{4\mp x}O_{11}$, wherein $0 \leq x \leq 1.4$ and $0 \leq y \leq 1$.

15. A ferromagnetic semiconductor material having a composition represented by the general formula: $SrFe_xCo_yTi_{6-(x+y)}O_{1l}$, wherein $0 \leq x \leq 5$, $0 \leq y \leq 5$, and $1(x+y) \leq 5$.

* * * * *